US007715961B1

(12) United States Patent
Kargupta

(10) Patent No.: US 7,715,961 B1
(45) Date of Patent: May 11, 2010

(54) ONBOARD DRIVER, VEHICLE AND FLEET DATA MINING

(75) Inventor: Hillol Kargupta, Ellicot City, MD (US)

(73) Assignee: Agnik, LLC, Columbia, MD (US)

( * ) Notice: Subject to any disclaimer, the term of this patent is extended or adjusted under 35 U.S.C. 154(b) by 1268 days.

(21) Appl. No.: 11/116,889

(22) Filed: Apr. 28, 2005

Related U.S. Application Data

(60) Provisional application No. 60/565,840, filed on Apr. 28, 2004.

(51) Int. Cl.
*G01M 17/00* (2006.01)

(52) U.S. Cl. .............................. 701/33; 701/1; 701/29; 701/32; 701/35; 701/36; 701/45; 701/70; 701/96; 701/102; 439/34; 439/133; 439/134; 342/357.1; 303/152; 307/10.1

(58) Field of Classification Search .................... 701/33, 701/1, 29, 32, 35, 36, 45, 70, 96, 102, 123, 701/201, 301, 701; 439/34, 133, 134; 342/357.09, 342/357.1; 303/152; 307/10.1; 455/552.1; 340/438
See application file for complete search history.

(56) References Cited

U.S. PATENT DOCUMENTS

| 2,177,064 A | 10/1939 | Harsted | 43/23 |
|---|---|---|---|
| 2,758,327 A | 8/1956 | Kennon | 15/104.002 |
| 3,011,499 A | 12/1961 | Tajan | 401/139 |
| 3,056,154 A | 10/1962 | Neal | 15/104 |
| 3,102,544 A | 9/1963 | Keegan et al. | 132/147 |
| 3,158,887 A | 12/1964 | Kanbar et al. | 15/104 |
| 3,189,069 A | 6/1965 | Stowell | 81/177.1 |
| 3,299,461 A | 1/1967 | Marks | 15/104 |
| 3,373,457 A | 3/1968 | Rouch, Jr. | 15/104 |
| 3,665,543 A | 5/1972 | Nappi | 15/215 |
| 4,742,547 A | 7/1973 | Watanabe | 15/104 |
| 4,062,083 A | 12/1977 | McKay | 15/106 |
| 4,107,811 A | 8/1978 | Imsande | 15/215 |
| 4,244,587 A | 1/1981 | Schweizer | 15/104.8 |
| 4,361,923 A | 12/1982 | McKay | 15/104 |
| 4,399,579 A | 8/1983 | McKay | 15/104 |
| 4,422,201 A | 12/1983 | McKay | 15/104 |
| 4,727,616 A | 3/1988 | Kucera et al. | 15/104 |
| 4,850,073 A | 7/1989 | Preuss | 15/207.2 |
| 4,905,337 A | 3/1990 | McKay | 15/104 |
| 4,969,231 A | 11/1990 | Mader et al. | 16/421 |

(Continued)

OTHER PUBLICATIONS

Kargupta, Distributed Data Mining for Sensor Networks, 2005, IEEE, p. 1-26.*

(Continued)

*Primary Examiner*—Khoi Tran
*Assistant Examiner*—McDieunel Marc
(74) *Attorney, Agent, or Firm*—James Creighton Wray

(57) ABSTRACT

The method and system use onboard data stream mining for extracting data patterns from data continuously generated by different components of a vehicle. The system stores the data patterns in an onboard micro database and discards the data. The system uses a resource-constrained, small, lightweight onboard data stream management processor, with onboard data stream mining, an onboard micro database, and a privacy-preserving communication module, which periodically and upon request communicates stored data patterns to a remote control center. The control center uses the data patterns to characterize the typical and unusual vehicle health, driving and fleet behavior.

21 Claims, 35 Drawing Sheets

U.S. PATENT DOCUMENTS

| | | | |
|---|---|---|---|
| 5,027,095 A | 6/1991 | McKay et al. | |
| 5,027,465 A | 7/1991 | McKay | 15/104 |
| 5,034,894 A | 7/1991 | Abe | |
| D320,680 S | 10/1991 | Stetson et al. | D30/158 |
| 5,074,144 A | 12/1991 | Krofchalk et al. | |
| D342,610 S | 12/1993 | Stetson et al. | D4/122 |
| D363,214 S | 10/1995 | Parola et al. | D9/300 |
| 5,499,182 A | 3/1996 | Ousborne | |
| 5,805,804 A * | 9/1998 | Laursen et al. | 709/223 |
| 5,819,989 A | 10/1998 | Saraceni | 221/192 |
| 5,878,457 A | 3/1999 | Cox et al. | 15/104.002 |
| 6,014,788 A | 1/2000 | Jaffri | 15/104.002 |
| 6,055,695 A | 5/2000 | McKay, Jr. | 15/104.002 |
| 6,127,014 A | 10/2000 | McKay, Jr. | 428/43 |
| 6,240,488 B1 * | 5/2001 | Mowry | 711/128 |
| 6,298,517 B1 | 10/2001 | McKay | 15/228 |
| 6,325,070 B1 | 12/2001 | Tyroler et al. | 132/112 |
| 6,330,499 B1 | 12/2001 | Chou et al. | |
| 6,609,051 B2 | 8/2003 | Fiechter et al. | |
| 6,957,133 B1 * | 10/2005 | Hunt et al. | 701/29 |
| 7,113,127 B1 * | 9/2006 | Banet et al. | 342/357.07 |
| 7,317,974 B2 * | 1/2008 | Luskin et al. | 701/29 |
| 2001/0041566 A1 * | 11/2001 | Xanthos et al. | 455/423 |
| 2004/0077347 A1 * | 4/2004 | Lauber et al. | 455/428 |
| 2005/0065682 A1 * | 3/2005 | Kapadia et al. | 701/35 |
| 2005/0131585 A1 * | 6/2005 | Luskin et al. | 701/1 |
| 2006/0161315 A1 * | 7/2006 | Lewis et al. | 701/1 |
| 2007/0069947 A1 * | 3/2007 | Banet et al. | 342/357.09 |

OTHER PUBLICATIONS

Kargupta & Puttagunta; *An Efficient Randomized Algorithm for Distributed Component Analysis from Heterogeneous Data*; Proceedings of SIAM International Data Mining Conference; Apr. 2004.

Kargupta et al.; *Onboard Vehicle Data Stream Monitoring using MineFleet and Fast Computation of Sparce Correlation Matrices*; Proceedings of SIAM International Data Mining Conference; Apr. 2004.

* cited by examiner

Figure 4

| r | Number of Additions | | Number of Multiplications | | Number of Nodes | |
|---|---|---|---|---|---|---|
| | $\mu$ | $\sigma$ | $\mu$ | $\sigma$ | $\mu$ | $\sigma$ |
| 2 | 875.6 | 564.7 | 10.4 | 7.7 | 5.2 | 3.8 |
| 4 | 722.4 | 468.2 | 3.4 | 2.6 | 1.8 | 1.3 |
| 6 | 1692.6 | 1376.9 | 6 | 6.2 | 3 | 3.1 |
| 8 | 1025 | 0 | 2 | 0 | 1 | 0 |
| 10 | 1281 | 0 | 2 | 0 | 1 | 0 |

Figure 5

| r | Number of Significant Coefficients Detected | | Number of Multiplications | | Number of Additions | |
|---|---|---|---|---|---|---|
| | $\mu$ | $\sigma$ | $\mu$ | $\sigma$ | $\mu$ | $\sigma$ |
| 2 | 4.8 | 1.09 | 12.8 | 4.3 | 1081.6 | 282.6 |
| 4 | 5.2 | 1.09 | 16 | 0 | 2456 | 250.4 |
| 8 | 4.8 | 1.09 | 14.4 | 3.5 | 4717.6 | 917.6 |
| 12 | 4.8 | 0.89 | 14.4 | 3.5 | 7072.8 | 1833.5 |
| 16 | 4.4 | 0.89 | 14.4 | 3.5 | 9428 | 1833.5 |
| 20 | 4.4 | 0.89 | 16 | 0 | 128008 | 0 |

Figure 8

| r | S | | D | | C' | |
|---|---|---|---|---|---|---|
|   | μ | σ | μ | σ | μ | σ |
| 4  | 11.4 | 4.00 | 304.4 | 90.44  | 131.8 | 45.74  |
| 8  | 14.6 | 5.46 | 423.3 | 170.15 | 208.0 | 89.65  |
| 12 | 17.4 | 6.30 | 478.2 | 133.79 | 244.9 | 71.60  |
| 16 | 20.2 | 4.40 | 580.2 | 166.53 | 302.1 | 91.21  |
| 20 | 21.6 | 5.04 | 629.6 | 171.86 | 333.6 | 89.70  |
| 24 | 22.9 | 4.41 | 744.6 | 170.85 | 400.5 | 101.09 |

Figure 9

| r | M | | A | |
|---|---|---|---|---|
|   | μ | σ | μ | σ |
| 4  | 304.4 | 90.44  | 4,712.0  | 1,041.07 |
| 8  | 423.3 | 170.15 | 10,582.5 | 3,753.73 |
| 12 | 478.2 | 133.79 | 16,691.4 | 4,229.64 |
| 16 | 580.2 | 166.53 | 25,871.4 | 6,400.18 |
| 20 | 629.6 | 171.86 | 33,793.6 | 8,249.27 |
| 24 | 744.6 | 170.85 | 45,739.8 | 8,178.53 |

Figure 10

| r | S | | D | | C' | |
|---|---|---|---|---|---|---|
| | μ | σ | μ | σ | μ | σ |
| 4 | 8.1 | 3.81 | 145.0 | 55.70 | 39.2 | 15.52 |
| 8 | 12.6 | 4.08 | 213.8 | 46.49 | 59.1 | 17.87 |
| 12 | 14.8 | 4.96 | 242.1 | 66.01 | 66.7 | 24.36 |
| 16 | 15.6 | 3.32 | 238.3 | 45.11 | 68.6 | 14.95 |
| 20 | 18.0 | 3.74 | 277.7 | 47.82 | 79.6 | 18.91 |
| 24 | 19.0 | 3.97 | 271.4 | 60.93 | 83.0 | 19.28 |
| 28 | 20.2 | 2.75 | 304.5 | 42.93 | 88.6 | 20.63 |

Figure 11

| R | C' | | M | | $\mathcal{A}$ | |
|---|---|---|---|---|---|---|
| | μ | σ | μ | σ | μ ×100 | σ×100 |
| 4 | 39.2 | 15.52 | 145.0 | 55.70 | 41.6 | 14.0 |
| 8 | 59.1 | 17.87 | 213.8 | 46.49 | 115.4 | 19.9 |
| 12 | 66.7 | 24.36 | 242.1 | 66.01 | 186.0 | 35.4 |
| 16 | 68.6 | 14.95 | 238.3 | 45.11 | 244.8 | 3,8.3 |
| 20 | 79.6 | 18.91 | 277.7 | 47.82 | 342.3 | 41.9 |
| 24 | 83.0 | 19.28 | 291.1 | 48.41 | 415.3 | 60.8 |
| 28 | 88.6 | 20.63 | 314.7 | 34.91 | 520.4 | 39.7 |

Figure 14

| MineFleet – Main Menu | | | | | | | |
|---|---|---|---|---|---|---|---|

Vehicle   Driver   Onboard Mining   Control Center Mining (Local Mining)   Fleet Analytics Report   Tools   Help

| Fleet Summary | Fleet Characteristics | Driver Summary | Driver Characteristics |
|---|---|---|---|

Select a vehicle from the list below:

| | Make | Model | Year | License | CurrentDriver | IP | Type | DataReceiver |
|---|---|---|---|---|---|---|---|---|
| Offline | Honda | Accord | 2001 | EWR309 | Unknown | | Car | Apr 25 03:45:03 EST |
| | | | | | | | | |
| | | | | | | | | |

Additional Information

| Document No. | [ ] | Engine No. | [ ] | | Onboard Control |
| Owner | [ ] | Date Acquired | [ ] | | Maintenance History |
| Fuel Type | [ ] | Last Maintenance Date: | [ ] | | |
| VIN: | [ ] | Next Maintenance Date: | [ ] | | Driver History |

Additional Information

| Message | Vehicle | Timestamp |
|---|---|---|
| | | |
| | | |
| | | |

Figure 15

| Add New Vehicle | □ | X |

Vehicle Info

VIN: [          ]   Select Fuel Type ▼
License: [          ]   Select Vehicle Type ▼

Vehicle History

Engine Number:            Document Number:
[          ]              [          ]

Last Maintenance:  Monday, April 12, 2004   [▦]
Next Maintenance:  Monday, April 12, 2004   [▦]
Date Acquired:     Monday, April 12, 2004   [▦]

[ Add New Vehicle ]   [ Cancel ]

Figure 22

| Create Segment – Histogram Analytic |
|---|

Use the drop down box below to associate a Trigger with this Segment definition. Additionally, select the learning definition you wish to use.

Segment Definition

Action:  Histogram

Segment name: ☐

Trigger: [Test_Trigger ▼]

Feature: [Calculated load value ▼]

☐ Save the rate of change of this feature (not its value)

Learning Definition

Select a condition from the combo box below to describe when the trigger has been learned.

[Convergence ▼]  ☐ threshold

Histogram Classes

Use the Add button below to create classes for your histogram. The ranges of the classes should be in increasing order, however do not necessarily have to be contiguous.

[Add class]  [Delete]

| Class | StartValue | EndValue |
|---|---|---|
| 1 | 0 | 10 |
| 2 | 10 | 20 |

[Create]  [Cancel]

Figure 23

| | Create Segment – Regime Monitoring/Parameter Dependency |
|---|---|

Use the drop down box below to associate a Trigger with this Segment definition. Additionally, select the learning definition you wish to use.

Segment Definition

Action: Regime Monitoring
Segment name: _____
Trigger: [ Test_Trigger ▼ ]

[ ] Save the rate of change of this feature (not its value)

Learning Definition

Select a condition from the combo box below to describe when the trigger has been learned.

[ Repetition ▼ ]  [____] times

Features to Profile

| | Feature |
|---|---|
| √ | Calculated load value |
| √ | Engine coolant temperature |
| √ | Short term fuel trim. Bank 1 (use if only 1 fuel trim) |
| √ | Long term fuel trim Bank 1 |
| √ | Short term fuel trim Bank 2 |
| √ | Long term fuel trim – Bank 2 |
| √ | Fuel pressure (gage) |

[ Create ]  [ Cancel ]

Figure 24

Create Segment – FFT Analytic

Use the drop down box below to associate a Trigger with this Segment definition. Additionally, select the learning definition you

Segment Definition

Action: FFT

Segment name: [          ]

Trigger: [ Test_Trigger ▼ ]

FFT Features: [ Calculated load value ▼ ]

[ ] Save the rate of change of this feature (not its value)

Learning Definition

Select a condition from the combo box below to describe when the trigger has been learned.

[ Repetition ▼ ]   [      ] times

[ Create ]  [ Cancel ]

Figure 27

| x1 | x2 |
|---|---|
| 4 | 1 |
| 4 | 5 |
| 6 | 8 |
| 1 | 4 |
| 7 | 1 |

Figure 28

| x1 | x3 |
|---|---|
| 4 | 5 |
| 1 | 6 |
| 5 | 9 |
| 2 | 10 |
| 7 | 4 |

Figure 29

| x1 | x2 | x3 |
|---|---|---|
| 4 | 1 | 5 |
| 4 | 5 | 5 |
| 1 | 4 | 6 |
| 7 | 1 | 4 |
| ... | ... | ... |

Figure 30

| n | Min | Max | Average | Std |
|---|---|---|---|---|
| 82 (0.5%) | 0.867346103 | 32.77100012 | 12.77044806 | 10.16425908 |
| 164 (1%) | 0.027423874 | 17.43252102 | 7.187024346 | 5.033721534 |
| 328 (2%) | 0.820308013 | 18.75680508 | 7.093226232 | 4.333195007 |
| 819 (5%) | 0.104738555 | 9.399980767 | 5.315443327 | 2.320975307 |
| 1147 (7%) | 0.012241207 | 6.894863875 | 3.121621662 | 1.945180969 |
| 1638 (10%) | 0.128892621 | 6.435619984 | 2.728972202 | 1.862081834 |

| n | Min | Max | Average | Std |
|---|---|---|---|---|
| 82 (0.5%) | 0.023904021 | 0.903167359 | 0.351953001 | 0.280126545 |
| 164 (1%) | 0.011823025 | 0.480439532 | 0.201370158 | 0.138667187 |
| 328 (2%) | 0.02242371 | 0.435290208 | 0.192059199 | 0.108333533 |
| 819 (5%) | 0.00288659 | 0.259063067 | 0.1464339 | 0.06396598 |
| 1147 (7%) | 0.000337326 | 0.204094168 | 0.086311445 | 0.054091998 |
| 1638 (10%) | 0.00355686 | 0.170327918 | 0.075930055 | 0.052386479 |

Figure 42

| i | MPG(i) | vbuck$_1$(i) | vbuck$_2$(i) | vbuck$_3$(i) | vbuck$_4$(i) | vbuck$_5$(i) | vbuck$_6$(i) | vbuck$_7$(i) | vbuck$_8$(i) | abuck$_1$(i) | abuck$_2$(i) | abuck$_3$(i) | abuck$_4$(i) | abuck$_5$(i) |
|---|---|---|---|---|---|---|---|---|---|---|---|---|---|---|
| 1 | 25.459 | 0.025 | 0.009 | 0.021 | 0.023 | 0.018 | 0.004 | 0.000 | 0.000 | 0.776 | 15.516 | 609.775 | 369.279 | 4.655 |
| 2 | 24.240 | 0.021 | 0.009 | 0.020 | 0.008 | 0.010 | 0.014 | 0.018 | 0.000 | 0.000 | 10.070 | 635.941 | 350.116 | 3.873 |
| 3 | 34.407 | 0.027 | 0.007 | 0.008 | 0.009 | 0.003 | 0.024 | 0.022 | 0.000 | 0.000 | 8.921 | 707.404 | 281.891 | 1.784 |
| 4 | 9.198 | 0.042 | 0.011 | 0.024 | 0.019 | 0.003 | 0.000 | 0.000 | 0.000 | 1.789 | 21.467 | 654.741 | 310.376 | 11.628 |
| 5 | 29.470 | 0.024 | 0.008 | 0.011 | 0.009 | 0.007 | 0.009 | 0.021 | 0.011 | 0.609 | 15.844 | 616.697 | 360.146 | 6.703 |
| 6 | 33.453 | 0.015 | 0.001 | 0.002 | 0.003 | 0.005 | 0.014 | 0.055 | 0.006 | 0.000 | 1.855 | 741.187 | 256.030 | 0.928 |
| 7 | 24.456 | 0.034 | 0.010 | 0.020 | 0.016 | 0.003 | 0.001 | 0.014 | 0.002 | 0.000 | 22.530 | 633.449 | 335.355 | 8.666 |
| 8 | 17.458 | 0.042 | 0.013 | 0.028 | 0.012 | 0.003 | 0.002 | 0.000 | 0.001 | 0.000 | 11.152 | 672.862 | 315.056 | 0.929 |
| 9 | 36.232 | 0.023 | 0.008 | 0.007 | 0.006 | 0.008 | 0.027 | 0.019 | 0.000 | 0.000 | 10.214 | 623.027 | 365.831 | 0.929 |
| 10 | 18.889 | 0.046 | 0.020 | 0.021 | 0.012 | 0.001 | 0.000 | 0.000 | 0.000 | 0.000 | 5.571 | 663.881 | 319.406 | 11.142 |
| 11 | 10.746 | 0.057 | 0.016 | 0.017 | 0.009 | 0.001 | 0.000 | 0.000 | 0.000 | 1.003 | 5.015 | 728.185 | 261.785 | 4.012 |

Figure 43

| Bucket | Range | Correlation(Bucket, MPG) |
|---|---|---|
| vbuck$_1$(i) | 0 to 10 miles/hour | -0.844592229 |
| vbuck$_2$(i) | 10 to 20 miles/hour | -0.700575577 |
| vbuck$_3$(i) | 20 to 30 miles/hour | -0.768169373 |
| vbuck$_4$(i) | 30 to 40 miles/hour | -0.456571397 |
| vbuck$_5$(i) | 40 to 50 miles/hour | 0.333757109 |
| vbuck$_6$(i) | 50 to 60 miles/hour | 0.82588152 |
| vbuck$_7$(i) | 60 to 70 miles/hour | 0.720758887 |
| vbuck$_8$(i) | 70 to 80 miles/hour | 0.40359784 |
| abuck$_1$(i) | -.003 to -.002 miles/sec$^2$ | -0.641477431 |
| abuck$_2$(i) | -.002 to -.001 miles/sec$^2$ | -0.211721352 |
| abuck$_3$(i) | -.001 to 0 miles/sec$^2$ | -0.107609553 |
| abuck$_4$(i) | 0 to .001 miles/sec$^2$ | 0.21945906 |
| abuck$_5$(i) | .001 to .002 miles/sec$^2$ | -0.547366135 |

Figure 46

Call:
lm(formula = MPG ~ vbucket1 + vbucket6 + I(abucket1^2))

Residuals:
```
   Min      1Q  Median      3Q     Max
-6.9282 -0.4279  0.9967  1.4868  2.5345
```

Coefficients:

|  | Estimate | Std. Error | t value | Pr(>|t|) |  |
|---|---|---|---|---|---|
| (Intercept) | 33.006 | 4.568 | 7.225 | 0.000174 | *** |
| vbucket1 | -329.295 | 110.635 | -2.976 | 0.020619 | * |
| vbucket6 | 359.132 | 143.938 | 2.495 | 0.041290 | * |
| I(abucket1^2) | -3.016 | 1.176 | -2.565 | 0.037286 | * |

---
Signif. codes:  0 `*' 0.001 `' 0.01 `*' 0.05 `.' 0.1 ` ' 1

Residual standard error: 3.234 on 7 degrees of freedom
Multiple R-Squared: 0.9132,    Adjusted R-squared: 0.876
F-statistic: 24.54 on 3 and 7 DF,  p-value: 0.0004334

ONBOARD DRIVER, VEHICLE AND FLEET DATA MINING

This application claims the benefit of U.S. Provisional Application No. 60/565,840, filed Apr. 28, 2004, which is hereby incorporated by reference in its entirety.

FIELD OF THE INVENTION

The present invention relates to multi-agent systems, distributed data stream mining, and privacy-preserving data mining for mobile and distributed mining of continuously generated vehicle data streams.

BACKGROUND OF THE INVENTION

No methods currently exist for multi-agent, distributed, privacy-preserving data stream mining system for characterizing vehicle, driver, and fleet monitoring. Existing monitoring systems work by downloading the data over wireless networks and then applying relatively simple linear threshold-based techniques for detecting unusual patterns.

Using data mining techniques for vehicle condition monitoring is a known art. Onboard driver performance measurement by mounting several sensors is also known. Such known systems, however, are directed primarily to performing vehicle diagnostics, assessing vehicle performance, or using sensors onboard to store the data on onboard systems and connecting the vehicle onboard computer to a remote computer for transmitting the data and visualizing it. There is no software that runs onboard a vehicle on a PDA or an embedded device and that uses lightweight data stream management and mining techniques for detecting driver's signature and continuously monitors as does the subject vehicle driver signature detection system.

For instance, U.S. Pat. No. 5,499,182 is directed to multiple vehicle component sensors mounted to a host vehicle measure vehicle component parameters indicative of a host vehicle's driver performance. A microprocessor module detachably coupled to the vehicle mounting unit affixed to and uniquely designated for a given host vehicle poles each vehicle sensor of that host vehicle to read, process, and store the vehicle operation data generated thereby. A playback mounting unit at a remote computer connects the remote computer to the host vehicle's microprocessor module in order to establish digital communication whereby the vehicle operation data and the analysis results processed therein are retrieved and displayed for a user. In addition, the driver integrity-checking module is based on some pre-determined values of the parameters and is done remotely after the data is played back on the remote computer. Also, the vehicle needs to be mounted by a multiple number of sensors as opposed to using the standard OBDII data bus for getting the vehicle data in the subject vehicle driver performance system.

U.S. Pat. No. 5,207,095 is directed to an onboard vehicle computer system for use in evaluating an operator's braking technique that employs a plurality of vehicle-mounted sensors. The onboard computer in that system periodically receives and stores the parametric values associated with vehicle braking sensed by the sensors. The data thus generated by that computer is then available to be read later by an instructor who compares the recorded parametric values to formulate further instructive steps. That system does not perform any lightweight and sophisticated onboard data mining techniques on the data. Any evaluations to be made in light of the raw data are left for the user to make by themselves. Furthermore, as the vehicle sensor monitoring system there is intended specifically as an instructional tool, monitoring is performed only during those discrete time intervals related to an instructional session.

U.S. Pat. No. 6,609,051 is directed to a vehicle condition-monitoring system that employs machine learning and data mining technologies on data acquired from a plurality of vehicles in order to create models. Frequent acquisition of vehicle sensor and diagnostic data enables comparison with the created models to provide continuing analysis of the vehicle for repair, maintenance and diagnostics. The on-board diagnostic systems process sensor readings and diagnostic information of the vehicle Embedded Control System in order to detect defaults. The maintenance systems on-board the vehicle continuously process sensor readings to determine the condition of the vehicle systems, parts and lubricants (e.g., brake pad wear, battery quality, and oil quality). Off-board diagnostic systems acquire vehicle diagnostics and sensor data or control on-board diagnostics and testing functions. The system uses OEM proprietary or standardized interfaces, for example, OBD to connect to the vehicle. Physical connections link the vehicle and the workshop test equipment, with short-range wireless communication systems eventually replacing cable connections.

U.S. Pat. No. 6,330,499 directs itself to a vehicle diagnostic and health monitoring system that includes a client computer device within the vehicle, coupled to the vehicle's monitoring systems, for data management, remote session management and user interaction, a communication system, coupled to the client computer device, for providing remote communication of data including data derived from internal monitoring systems of the vehicle, and a remote service center including a vehicle data store, a server computer, a diagnostic engine, and a communicator for communicating the results of analysis of vehicle information to the client computer device via the communication system.

U.S. Pat. No. 5,034,894 directs itself to a self-diagnosis computer system onboard a motor vehicle wherein a plurality of detectors are mounted on that vehicle's engine to detect any aberrant operating conditions. Although the computer system there performs continual monitoring while the vehicle is in operation, no provision is made for the assessment of driver performance based on any sensed parameters.

Similarly, U.S. Pat. No. 5,074,144 is directed to an onboard vehicle computer system for monitoring vehicle performance. Various transducers for continually monitoring various vehicle parameters are employed in that system; however, comprehensive means for analyzing the measured vehicle parameters to characterize or assess driver performance, per se, are not provided.

Prior state-of-the-art is based on linear threshold-based techniques that allow simple tasks such as detection of a feature value crossing a limit set a priori. Moreover, these techniques are applied after the data is uploaded to a remote desktop computer from the vehicle. For example, these techniques may check whether the driver crossed a specified speed limit. Unfortunately, these techniques are not capable of detecting linear and nonlinear complex driving patterns and they require an expensive process of transferring data to a remote monitoring station at a regular basis over the wireless network.

Needs exist for improved systems using mobile and distributed data stream management and mining algorithms for mining continuously generated data from different components of a vehicle.

SUMMARY OF THE INVENTION

The present invention is a method and system using mobile and distributed data stream mining algorithms for mining continuously generated data from different components of a vehicle. The system is designed for both onboard or remote mining and management of the data in order to characterize the typical and unusual vehicle health, driving, and fleet behavior. The system uses resource-constrained lightweight data stream management, stream mining, distributed data mining, and privacy-preserving data mining techniques.

The present approach is based on advanced multi-variate data stream mining techniques that work using the following collection of general technology categories:

i) Data stream mining
  ii) Distributed data stream mining
  iii) Privacy-preserving data mining The current approach offers major improvement in capabilities on two grounds. First, avoiding the expensive process of uploading the data generated by the vehicle continuously to a remote desktop-based monitoring computer over a wireless network. The approach dramatically cuts down the operating cost of such a driver characterization and monitoring system. Second, it offers advanced analytical capabilities for driver characterization and monitoring that work onboard the vehicle.

The current invention is a multi-agent distributed vehicle data mining software system that executes data stream mining methods for extracting the underlying patterns hidden in the continuous stream of data generated by the different vehicle components in multiple vehicles connected over a data communication network.

The system has four main components. The first component is an interface for the on-board diagnostic (OBD-II) data bus that couples with the software system. The system may also be connected with onboard GPS module and other sensors.

The second component is an onboard data stream management and mining module. The system offers a communication system and a run time environment for performing onboard data analysis and management. The onboard PDA-based, or other similar computing device, module applies different data stream mining techniques on the data stream continuously and triggers actions when unusual patterns are observed. The onboard module connects to the desktop-based remote control station (a computing device) through a wireless network. The system allows the fleet managers to model vehicle and driver behavior remotely without necessarily downloading all the data to the control station over the wireless connection.

The third component is a remote desktop-based control station for fleet managers. The control station supports the following main operations: (i) interacting with the onboard module for remote management and mining of vehicle data streams from multiple vehicles; (ii) interactive statistical data analysis; and (iii) visualization of the driving characteristics generated by several time series data mining techniques.

The fourth component is a privacy management module. This module plays an important role in the implementation of the privacy policies. For example, the fleet drivers may have a justifiable objection to continuous monitoring of driving behavior. However, they may be willing to allow the management to analyze the data for detecting drunk drivers as long as the privacy of sober drivers is not compromised.

The system of the present invention works using a collection of data stream mining algorithms for driver, vehicle, and fleet characterization.

Some of the data stream mining algorithms are as follows. A randomized technique for efficient continuous computation of the correlation, inner product, and Euclidean distance matrices. This technique is used for continuous detection of statistical dependencies among different data attributes and constructing the behavioral signatures of the driver, vehicle, and the fleet.

Incremental Fourier/Wavelet transformations and segmentation techniques for vehicle, driver, and fleet behavior tracing and comparison with typical behavior signatures. The signatures may be constructed for a collection of different segments in a given vehicle trajectory.

Distributed computation of correlation, inner product, and Euclidean distance matrices for comparing current data and patterns with typical characteristics stored onboard or at a remote location. This involves distributed computation using onboard data from one or multiple vehicles and the remote control station.

Automated rule learning from vehicle data using data stream mining techniques.

Modeling of fuel consumption behavior, associating the model with driving characteristics, and optimizing the models for better fuel consumption characteristics.

Incremental random projection of data stream for vehicle, driver, and fleet behavior detection.

Incremental statistical analysis and hypothesis testing from data streams.

Identify fleet-level (multi-vehicle) behavior patterns.

Compare the performance of one vehicle with that of another.

Identify the inefficient components of the fleet.

Optimize fleet performance.

Detect rules that capture the emerging patterns in the fleet level behavior.

Detect unusually behaving vehicles in a fleet.

The system generally works in the following two modes: (i) a typical behavior learning phase, and (ii) monitoring phase.

The typical behavior-learning phase involves the following steps. Receiving the vehicle parameters from onboard vehicle data bus and other sensors to the onboard computer. Learning the driving behavior by detecting the underlying "signature" from the driving pattern defined by a collection of different parameters. Learning the typical vehicle behavior by detecting the underlying "signature" from vehicle data streams. The "signature" is defined by a combination of different parameters, detected by the data mining algorithms. Generating and storing the vehicle and driver behavior models onboard the vehicle. Communicating and storing the vehicle and driver behavior models to the remote control station. Generating and storing the fleet level models at the remote control station. Communicating generated patterns and models to the remote control center that has access to the vehicle data by wireless network.

The monitoring phase includes the following steps. Comparing the incoming data patterns with the driver and vehicle signature profiles. Reporting to the appropriate authority (driver and/or fleet manager according to the privacy policy) in case the observed data patterns do not match with typical driver and vehicle signature profiles. Communicating generated patterns and models to the remote control center that has access to the vehicle data by wireless network if the new incoming data is an outlier.

The present invention is particularly useful for commercial fleet management. The application is suitable for the hazardous material transportation industry and the public transportation sectors, where safety and security are very important to quantify. Companies in these fields have existing hardware for getting the vehicle data to an onboard computer but none of them use any lightweight sophisticated data mining techniques for driver characterization. The application may also have a significant impact on the operation and maintenance of individually owned personal cars.

These and further and other objects and features of the invention are apparent in the disclosure, which includes the above and ongoing written specification, with the drawings.

BRIEF DESCRIPTION OF THE DRAWINGS

FIG. 4 shows the number of multiplications and additions (with a scaling factor of number-of-data-rows) performed by the proposed algorithms for correctly detecting no significant changes in the correlation matrix.

FIG. 5 shows the number of multiplications and additions performed by the naive and the new algorithm for correctly detecting that some of the entries of the correlation matrix have significantly changed and identifying the portions of the matrix with the significantly changed coefficients.

FIG. 8 shows the performance of the proposed algorithm in detecting the significant coefficients using the vehicle data.

FIG. 9 shows the performance of the proposed algorithm in detecting the significant coefficients using the vehicle data.

FIG. 10 shows the performance of the proposed algorithm in detecting the significant coefficients using the vehicle data with artificially controlled sparseness of the correlation matrix.

FIG. 11 shows the performance of the proposed algorithm in detecting the significant coefficients using the vehicle data with artificially controlled sparseness of the correlation matrix.

FIG. 14 shows a main window of the control center that comes up when the user presses start on the welcome screen.

FIG. 15 shows a window that appears when the user selects the vehicle menu from the main window of the control center.

FIG. 22 shows a panel that is displayed when "histogram" is selected in the tree and the add trigger button is clicked.

FIG. 23 shows a panel that is displayed when "regime monitoring" or "parameter dependency" is selected in the tree on the left of the onboard control window and the add trigger button is clicked.

FIG. 24 shows a panel that is displayed when "FFT" is selected in the tree on the left of the onboard control window.

FIG. 27 shows a data table at site 1.

FIG. 28 shows a data table at site 2.

FIG. 29 shows a joined data table (based on the shared $x_1$) needed for centralized data mining systems.

FIG. 30 shows the minimum, maximum, average, the standard deviation of the relative error and the corresponding value of n computed over 20 complete runs.

FIG. 42 shows densities (rounded to 3 decimals) of all the histogram buckets for each of the 11 partitions of a 2003 Chevy Cavalier data.

FIG. 43 is a correlation coefficient between miles per gallon and the buckets heights in the velocity and acceleration histogram.

FIG. 46 shows one possible linear model found by using R.

DETAILED DESCRIPTION OF THE PREFERRED EMBODIMENTS

Figure 1:
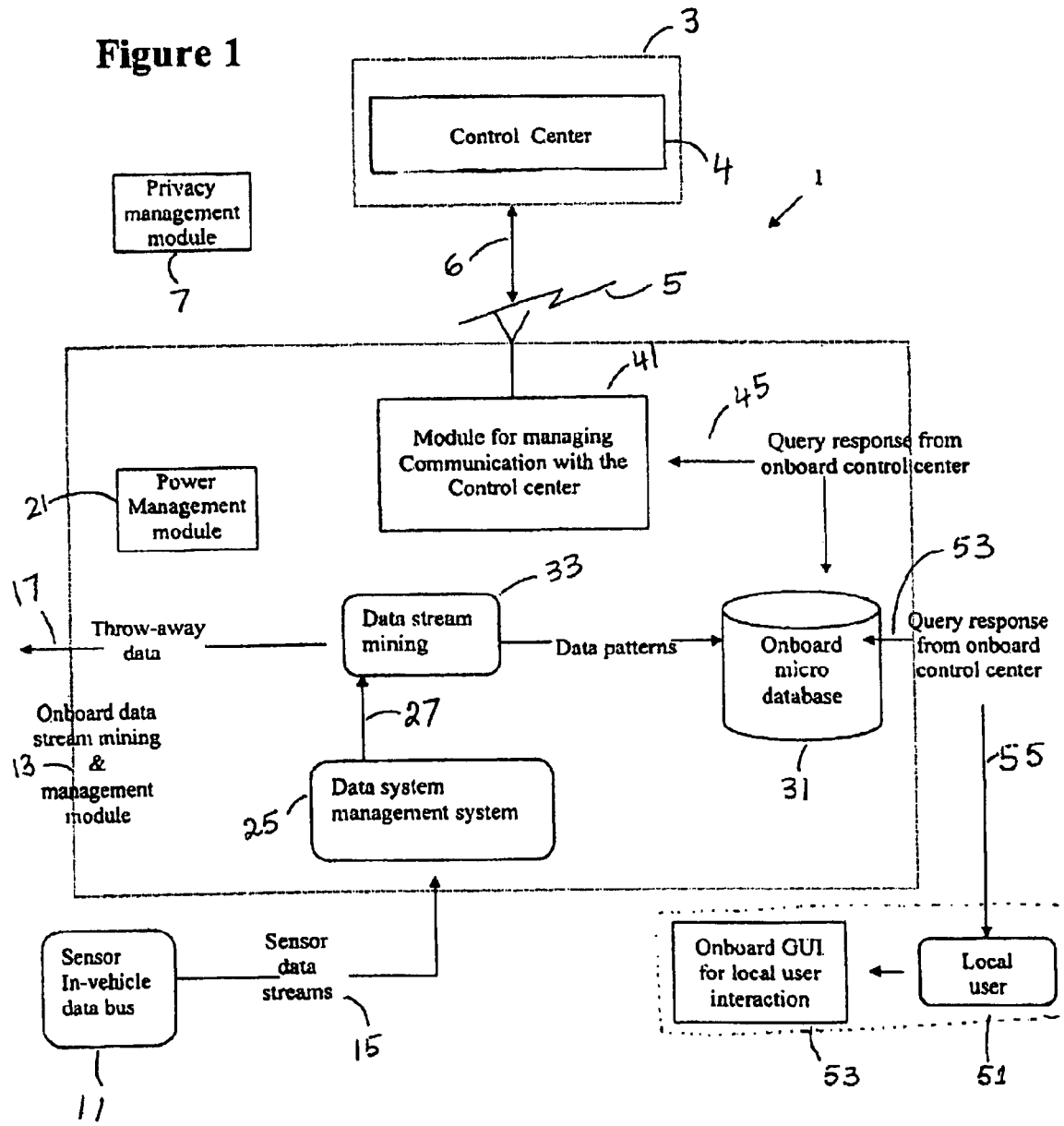
FIG. 1 shows a conceptual depiction of the present system.

The present invention is a method and system using mobile and distributed data stream mining algorithms for mining continuously generated data from different components of a vehicle. The system is designed for both onboard or remote mining and management of the data in order to characterize the typical and unusual vehicle health, driving, and fleet behavior. The system uses resource-constrained lightweight data stream management, stream mining, distributed data mining, and privacy-preserving data mining techniques.

The present approach is based on advanced multi-variate data stream mining techniques that work using the following collection of general technology categories:

i) Data stream mining
ii) Distributed data stream mining
iii) Privacy-preserving data mining The current approach offers major improvement in capabilities on two grounds. First, avoiding the expensive process of uploading the data generated by the vehicle continuously to a remote desktop-based monitoring computer over a wireless network. The approach dramatically cuts down the operating cost of such a driver characterization and monitoring system. Second, it offers advanced analytical capabilities for driver characterization and monitoring that work onboard the vehicle.

The current invention is a multi-agent distributed vehicle data mining software system that executes data stream mining methods for extracting the underlying patterns hidden in the continuous stream of data generated by the different vehicle components in multiple vehicles connected over a data communication network.

The system has four main components. The first component is an interface for the on-board diagnostic (OBD-II) data bus that couples with the software system. The system may also be connected with onboard GPS module and other sensors.

The second component is an onboard data stream management and mining module. The system offers a communication system and a run time environment for performing onboard data analysis and management. The onboard PDA-based, or other similar computing device, module applies different data stream mining techniques on the data stream continuously and triggers actions when unusual patterns are observed. The onboard module connects to the desktop-based remote control station (a computing device) through a wireless network. The system allows the fleet managers to model vehicle and driver behavior remotely without necessarily downloading all the data to the control station over the wireless connection.

The third component is a remote desktop-based control station for fleet managers. The control station supports the following main operations: (i) interacting with the onboard module for remote management and mining of vehicle data streams from multiple vehicles; (ii) interactive statistical data analysis; and (iii) visualization of the driving characteristics generated by several time series data mining techniques.

The fourth component is a privacy management module. This module plays an important role in the implementation of the privacy policies. For example, the fleet drivers may have a justifiable objection to continuous monitoring of driving behavior. However, they may be willing to allow the management to analyze the data for detecting drunk drivers as long as the privacy of sober drivers is not compromised.

The system of the present invention works using a collection of data stream mining algorithms for driver, vehicle, and fleet characterization.

Some of the data stream mining algorithms are as follows. A randomized technique for efficient continuous computation of the correlation, inner product, and Euclidean distance matrices. This technique is used for continuous detection of statistical dependencies among different data attributes and constructing the behavioral signatures of the driver, vehicle, and the fleet.

Incremental Fourier/Wavelet transformations and segmentation techniques for vehicle, driver, and fleet behavior tracing and comparison with typical behavior signatures. The signatures may be constructed for a collection of different segments in a given vehicle trajectory.

Distributed computation of correlation, inner product, and Euclidean distance matrices for comparing current data patterns with typical characteristics stored onboard or at a remote location. This involves distributed computation using onboard data from one or multiple vehicles and the remote control station.

Automated rule learning from vehicle data using data stream mining techniques.

Modeling of fuel consumption behavior, associating the model with driving characteristics, and optimizing the models for better fuel consumption characteristics.

Incremental random projection of data stream for vehicle, driver, and fleet behavior detection.

Incremental statistical analysis and hypothesis testing from data streams.

Identify fleet-level (multi-vehicle) behavior patterns.

Compare the performance of one vehicle with that of another.

Identify the inefficient components of the fleet.

Optimize fleet performance.

Detect rules that capture the emerging patterns in the fleet level behavior.

Detect unusually behaving vehicles in a fleet.

The system generally works in the following two modes: (i) a typical behavior learning phase, and (ii) monitoring phase.

The typical behavior-learning phase involves the following steps. Receiving the vehicle parameters from onboard vehicle data bus and other sensors to the onboard computer. Learning the driving behavior by detecting the underlying "signature" from the driving pattern defined by a collection of different parameters. Learning the typical vehicle behavior by detecting the underlying "signature" from vehicle data streams. The "signature" is defined by a combination of different parameters, detected by the data mining algorithms. Generating and storing the vehicle and driver behavior models onboard the vehicle. Communicating and storing the vehicle and driver behavior models to the remote control station. Generating and storing the fleet level models at the remote control station. Communicating generated patterns and models to the remote control center that has access to the vehicle data by wireless network.

The monitoring phase includes the following steps. Comparing the incoming data patterns with the driver and vehicle signature profiles. Reporting the appropriate authority (driver and/or fleet manager according to the privacy policy) in case the observed data patterns do not match with typical driver and vehicle signature profiles. Communicating generated patterns and models to the remote control center that has access to the vehicle data by wireless network if the new incoming data is an outlier.

The present invention is particularly useful for commercial fleet management. The application is suitable for the hazardous material transportation industry and the public transportation sectors, where safety and security are very important to quantify. Companies in these fields have existing hardware for getting the vehicle data to an onboard computer but none of them use any lightweight sophisticated data mining techniques for driver characterization. The application may also have a significant impact on the operation and maintenance of individually owned personal cars.

The present invention is useful for onboard data stream monitoring. Many resource-constrained data intensive environments such as sensor networks, on-board scientific payloads, and on-board monitoring systems require frequent computation of statistical aggregates from continuous data streams. A vehicle data stream mining/monitoring system focuses on one module that requires frequent computation of correlation matrices using lightweight onboard computing devices. It offers an efficient randomized algorithm for monitoring sparse correlation, inner product, and Euclidean distance matrices, among others. Unlike the existing approaches that compute all the $O(n^2)$ entries of these matrices from an m×n data set, the technique works using a divide-and-conquer approach. A probabilistic test is used for quickly detecting whether or not a subset of coefficients contains a significant one with a magnitude greater than a user given threshold. The test is used for quickly identifying the portions of the space that contain significant coefficients. The algorithm is particularly suitable for monitoring correlation matrices of continuous data streams.

Many onboard real-time data stream monitoring applications require frequent computation of statistical aggregates such as correlation, inner product, and distance matrices. Sensor networks, on-board scientific payloads and on-board mining systems are some examples.

The present system is designed for monitoring and mining vehicle data streams in real time. It monitors vehicle fleets using onboard PDA or similar "lightweight" hardware-based data stream mining system and other remote desktop-based monitoring modules connected through wireless networks. The present system's onboard module monitors the vehicle health and driving characteristics. This involves computing various empirical properties of the data distribution such as correlation, inner product, and Euclidean matrices.

A novel algorithm is used for fast approximate computation of these matrices that may be used for monitoring the statistical distribution properties of the incoming data. The algorithm may be used for computing many statistical aggregate matrices, for example, a sparse correlation matrix computation problem. Detecting statistical dependencies among different features is a necessary step in various data mining applications. Correlation matrix offers one way to identify dependencies among pairs of features. Computing the correlation matrix from a given centralized data set is a relatively well-understood process and it is frequently used in practice.

The present system is a mobile data stream mining environment where the resource-constrained "small" computing devices perform various non-trivial data management and mining tasks on-board a vehicle in real-time. The present system analyzes the data produced by the various sensors present in most modern vehicles. It continuously monitors data streams generated by a moving vehicle using an onboard computing device, identifies the emerging patterns, and if necessary reports these patterns to a remote control center over low-bandwidth wireless network connection, if necessary. It also offers different distributed data mining capabilities for detecting fleet-level patterns across the different vehicles in the fleet. This section presents a brief overview of the architecture of the system and the functionalities of its different modules.

FIG. 1 shows a conceptual depiction of the present system. The present system analyzes and monitors only the data generated by the vehicle's on-board diagnostic system and the Global Positioning System (GPS). The system is implemented for WinCE based mobile devices like Personal Digital Assistants and handheld computers. The overall conceptual process 1 diagram of the system is shown in FIG. 1. A central site concurrently monitors multiple vehicles installed with the current software. The vehicles may have different types of computing devices ranging from PDA's to special-purpose tablet PCs monitoring, collecting, and analyzing the data generated by the vehicle. Any standard commercial data network may be used for the wireless communication.

The onboard data stream mining and management module 21 has a data stream management system 25 that receives vehicle sensor streams 15 from a sensor data bus 11 remote from the onboard data stream mining and management module. The data stream management system 25 separates normal data 27 from the data streams 15 and provides initial interesting data and patterns 29 to the onboard micro database 31. Normal data 27 is provided to data stream mining 33 that further selects interesting data and patterns 35 and provides them to the onboard database 31. The remainder of the data is useless and is thrown away 17.

The module 41 for managing communications with the control center receives an inquiry 6 over wireless net 5 from the off board 3 control center 4 and sends the query 43 to the onboard micro database 31. A response 45 is directed from database 31 through the communication managing module 41 over the wireless net 5 to the control center 4.

A query 53 from the local user's 51 onboard control center 53 goes to the onboard micro control center 31. A response 55 is returned to the local center 53 for the onboard GUI for local user interaction 57. A privacy module 7 and a power management module 21 may be provided.

The present system is comprised of four important components:

1. On-board hardware module: Hardware interface for the onboard diagnostic (OBD-111 data bus that couples with the current software. A GPS device is also connected with this module. The system works with commercially manufactured hardware interfaces, and also with a hardware set-up.

2. On-board data stream management and mining module: The system offers a communication system and a run-time environment for performing on-board data analysis and management. The onboard PDA or cell phone based module monitors, manages the data stream, and triggers actions when unusual activities are observed. The on-board module connects to the desktop-based remote control station through a wireless network. The system allows the fleet managers to monitor and model vehicle behavior remotely without necessarily downloading all the data to the remote central monitoring station over the expensive wireless connection. However, if appropriate the system supports analyzing data at the central control station after downloading the data for any given period. The on-board module also supports peer-to-peer communication with other vehicles, cargos, mobile objects, and stationary land-based objects over standard wireless networks. This mode is used to support data communication and distributed peer-to-peer data mining for privacy sensitive characterization and monitoring of drivers and vehicles in an ad hoc group of vehicles, drivers, cargos and land-based objects.

3. Remote control station module: The remote desktop-based control station for fleet managers: The present system control station supports the following main operations: (i) interacting with the on-board module for remote management, monitoring, and mining of vehicle data streams; (ii) interactive statistical data analysis; and (iii) visualization of the driving characteristics generated by various time series data analysis techniques.

4. Privacy management module: This module plays an important role in the implementation of the privacy policies. For example, drivers of a commercial fleet may have a quite justifiable objection against continuous monitoring of their driving behavior. However, they may be willing to allow the management to analyze the data for detecting drunk drivers as long as the privacy of the sober drivers is not compromised.

In order to monitor the vehicle data streams using the on board data management and mining module continuous computation of several statistics is needed. For example, the current onboard system has a module that continuously monitors the spectral signature of the data that requires computation of covariance and correlation matrices on a regular basis. The onboard driving behavior characterization module requires frequent computation of similarity/distance matrices for data clustering and monitoring the operating regimes. Since the data are usually high dimensional, computation of the correlation matrices or distance (e.g. inner product, Euclidean) matrices is difficult to perform using conventional algorithmic implementations. The incoming data sampling rate, supported by the OBD-II data bus, limits the amount of time for processing the observed data. This usually means that one gets on the order of a few seconds to quickly analyze the data using the onboard hardware (when the mining is done onboard). If our algorithms take more time, the system cannot catch up with the incoming data rate. In order to handle this situation, the following issues must be addressed:

1) Fast techniques are needed for computing the correlation, covariance, inner product, and distance matrices that are frequently used in data stream mining applications.

2) Algorithms are needed that do something useful when the running time is constrained. In other words, the data-mining algorithm runs for a fixed amount of time and is expected to return some meaningful information. For example, the correlation matrix computation algorithm is given one second of CPU time for identifying the coefficients with magnitude greater than 0.7 and if that time is not sufficient for computing all the correlation coefficients in the matrix then the algorithm should at least identify the portions of the matrix that may contain significant coefficients. The precision of this identification is likely to depend on the amount of computing resource allocated to the algorithm.

The Pearson Product-Moment Correlation Coefficient, or "correlation coefficient" for short, is a measure of the degree of linear relationship between two random variables: a and b. The correlation between a and b is commonly defined as follows:

$$\text{Corr}(a, b) = \frac{\text{Cov}(a, b)}{\sigma_a \sigma_b}$$

Where Cov(a,b) is the covariance between a and b; $\sigma_a$ and $\sigma_b$ are the standard deviations of a and b respectively.

The correlation coefficient takes a value between +1 to −1. A correlation of +1 implies a perfect positive linear relationship between the variables. On the other hand, a correlation of −1 implies a perfect negative linear relationship between the variables. A zero correlation coefficient means the two variables vary independently. A correlation coefficient is significant if its magnitude is greater than or equal to a user given threshold.

In data mining applications the correlation coefficients are often estimated from a given data set comprised of m-pairs of tuple $(x_i, y_i)$ where $x_i$ and $y_i$ are the ith observations of X and Y respectively. The following expression is commonly used for that:

$$\text{Corr}(X, Y) = \frac{\sum x_i y_i - \frac{\sum x_i \sum y_i}{m}}{\sqrt{\left(\sum x_i^2 - \frac{(\sum x_i)^2}{m}\right)\left(\sum y_i^2 - \frac{(\sum y_i)^2}{m}\right)}}$$

If the data vectors have been normalized to have 0 mean and unit length ($l_2$ norm), the resulting expression for correlation coefficient is a lot simpler. Let X' and Y' be the new column vectors generated from the given column data vectors X and Y (with slight abuse of symbols) after the normalization.

$$\text{Corr}(X', Y') = \sum_{i=1}^{m} x_i y_i \quad (1)$$

Therefore, if U be the data matrix with m rows corresponding to different observations and n columns corresponding to different attributes, the correlation matrix is $U^T U$. For this discussion, assume that the data sets have been normalized first. The term correlation-difference matrix is used in the context of continuous data streams. If $\text{Corr}_t(X',Y')$ and $\text{Corr}_{t+1}(X',Y')$ are the correlation coefficients computed from the data blocks observed at time t and t+1 respectively then the correlation difference coefficient is defined as $\text{Corr}_{t+1}(X', Y')-\text{Corr}_t(X',Y')$. When there are more than two data a column corresponding to different attributes, a set of such coefficients exists that is represented in the form of a matrix. This matrix is called the correlation-difference matrix.

Also note that the problem of computing the Euclidean distance matrix is closely related to the correlation matrix and inner product computation problem. The Euclidean distance between the data vectors corresponding to X and Y, $$\sum_{i=1}^{m} (x_i - y_i)^2 = \sum_{i=1}^{m} (x_i^2 + y_i^2 - 2x_i y_i) = \sum_{i=1}^{m} x_i^2 + \sum_{i=1}^{m} y_i^2 - 2\sum_{i=1}^{m} x_i y_i$$

Correlation coefficient computation is also very similar to the problem of computing the inner product from data.

Therefore, the algorithm is presented only in the context of the correlation computation problem. An efficient technique for computing correlation matrix is equally applicable to the inner product and Euclidean distance computation problem.

Efficient computation of the correlation matrix has been addressed in the literature. Previous methods exploited an interpretation of the correlation coefficient as a measure of Euclidean distance between two data vectors. The previous systems have been applied to compute correlation matrices from continuous data streams. The results show scalable improved performance compared to the naive way to compute the correlation coefficients. Others considered the problem of robust estimation of covariance matrix for data mining applications.

Unlike the traditional correlation matrix computation approach, the current algorithm offers the following capabilities:

1) Quickly check if the correlation matrix has changed or not using a probabilistic test.

2) Apply this test and a divide-and-conquer strategy to quickly identify the portions of the correlation matrix that contain the coefficients with significant magnitude.

This is also extended to the case where identification of the portions of coefficient matrix with coefficients that changed significantly is desired.

Given an m×n data matrix X, compute the correlation matrix $X^TX$. Sparse correlation matrices are of interest because in most real-life high dimensional applications features are not highly correlated with every other feature. Instead only a small group of features are usually highly correlated with each other. This results in a sparse correlation matrix. Moreover, a technique is developed that may monitor the changes in a correlation matrix over time in a data stream scenario. In most stream applications, including the current system, the difference in the consecutive correlation matrices generated from two subsequent sets of observations is usually small, thereby making the difference matrix a very sparse one.

A naive approach to compute the correlation matrix using matrix multiplication takes O(mn) multiplications. The objective is to present an efficient technique for computing sparse correlation matrices. If the matrix has O(c) number of significant coefficients then the algorithms runs in O(c log n) time.

Let $x_i=[x_{i,1}, x_{i,2}, \ldots, x_{i,m}]$; $\sigma_p=[\sigma_{1,P}, \sigma_{2,P}, \ldots, \sigma_{n,p}]$ denote the ith row of the data matrix X, and let $x_i$ be a randomly generated row matrix such that $\sigma_{1,p} \in \{-1,1\}$ with uniform distribution. Let $L_{\{i1,i2,\ldots,ik\}} = \{i_1, i_2, \ldots, i_k\}$ denote a set of k indices $i_1, i_2, \ldots, i_k$ and $L_{\{i1,i2,\ldots,ik\},p} = \{s_1, s_2, \ldots, s_k\}^T$ such that $$s_{j,p} = x_{j,i1}\sigma_{i1,p} + x_{j,i2}\sigma_{i2,p} + \ldots + x_{j,ik}\sigma_{ik,p} = \sum_{l=i_1,i_2,\ldots,i_k} x_{j,l}\sigma_{l,p}$$

Now consider computing $s_{j,p}$ for every row in the data matrix using the same random binary vector $\sigma_p$ for every row. Note that the mean value of $s_{j,p}$ computed over all different rows, $$\frac{1}{m}\sum_{j=1}^m s_{j,p} = \frac{1}{m}\sum_{j=1}^m \sum_l x_{j,l}\sigma_{l,p} = \frac{1}{m}\sum_l \sigma_{l,p}\sum_{j=1}^m x_{j,l} = 0$$

The above expression is zero since the data columns are assumed to be mean zero. If they originally do not come with that property, then the column means are translated to zero.

$$\text{Var}(S_{\{i_1,i_2,\ldots,i_k\},p}) = \frac{1}{m}\sum_{j=1}^m s_{j,p}^2 \qquad (2)$$

$$= \frac{1}{m}\sum_j \sum_l x_{j,l}\sigma_{l,p}\sum_q x_{j,q}\sigma_{q,p}$$

$$= \frac{1}{m}\sum_{l,q}\sigma_{l,p}\sigma_{q,p}\sum_j x_{j,l}x_{j,q}$$

$$= \sum_{l,q}\sigma_{l,p}\sigma_{q,p}\text{Corr}(x_l, x_q)$$

Now taking the square of both sides of Equation 2 and summing up each side for p=1, 2, ..., r gives, $$\sum_{p=1}^r \text{Var}(S_{\{i_1,i_2,\ldots,i_k\},p})^2 = \sum_p \sum_{l_1,q_1}\sigma_{l_1,p}\sigma_{q_1,p}\text{Corr}(x_{l_1},x_{q_1}) \cdot \sum_{l_2,q_2}\sigma_{l_2,p}\sigma_{q_2,p}\text{Corr}(x_{l_2}, x_{q_2}) \qquad (3)$$

$$= \sum_{l_1,q_1,l_2,q_2}\text{Corr}(x_{l_1} x_{q_1})\text{Corr}(x_{l_2}, x_{q_2}) \cdot \sum_{p=1}^r \sigma_{l_1,p}\sigma_{q_1,p}\sigma_{l_2,p}\sigma_{q_2,p}$$

$$= r\sum_{l_1,q_1}\text{Corr}(x_{l_1} x_{q_1})^2$$

The final step in Equation 2 is based on the following observation:

$$Lt_{r\to\infty}\frac{1}{r}\sum_{p=1}^r \sigma_{l_1,p}\sigma_{q_1,p}\sigma_{l_2,p}\sigma_{q_2,p} = 0 \text{ for } l_1 \neq l_2 \text{ or } q_1 \neq q_2.$$

The corresponding variance is 1/r.

Noting that $\text{Corr}(x_1,x_1)=1$, Equation 3 gives, $$\sum_{l\neq q}\text{Corr}(x_l, x_q)^2 \approx \frac{1}{r}\sum_{p=1}^r \text{Var}(S_{\{i_1,i_2,\ldots,i_k\},p})^2 - k \qquad (4)$$

Therefore, given a set of data column vectors $X_{i1}, X_{i2}, \ldots, X_{ik}$ in order to detect if any of these columns is strongly correlated with the rest the first step is to randomly add and subtract the columns for generating the column vector $S_{\{i1,i2,\ldots,ik\},p}$. Compute its variance (i.e. correlation with itself) and plug it in the right hand side of the above equation. If the result is 0 then the data columns are not correlated. If any of the correlation coefficients has a magnitude greater than $\theta$ then the right hand side of the Equation 4 must produce a value greater than of equal to $\theta^2$.

Figure 2:
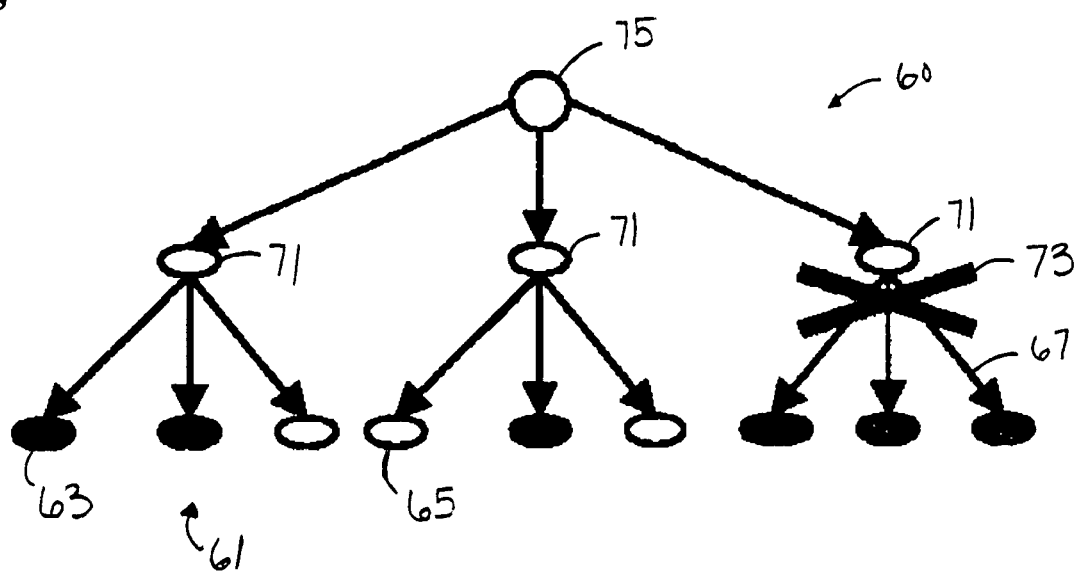
FIG. 2 shows a graphical representation of the divide-and-conquer strategy-based algorithm for computing the significant correlation coefficients.

FIG. 2 shows a graphical representation of the divide-and-conquer strategy-based algorithm for computing the significant correlation coefficients. Each node represents a collection of correlation coefficients. Each leaf node represents a single coefficient. The black colored leaves represent insignificant coefficients. The algorithm applies the probabilistic test at every internal node for pruning out the sub-tree if it does not have a child leaf that is significant.

In FIG. 2 on subtree 60, leaf nodes 61 represent single correlation coefficients. Black nodes 63 represent insignificant correlation coefficients. White nodes 65 represent significant correlation coefficients. Internal nodes 71 prune out subtrees such as subtree 67. A higher order node 75 leads to the internal nodes 71.

Computation of the right hand side of Equation 4 may be further simplified as follows.

$$\text{Let } Z_{\{i1,i2,\ldots,ik\},p} = \sum_i S_{i,p}\sigma_{i,p}.$$

Therefore the following is written, $$Z^2_{\{i1,i2,\ldots,ik\},p} = \sum_{i,j} S_{i,p}S_{j,p}\sigma_{i,p}\sigma_{j,p}$$

$$\frac{1}{r}\sum_{p=1}^{r} Z^2_{\{i1,i2,\ldots,ik\},p} \approx \sum_j s^2_{j,p} = m\text{Corr}(S_{\{i1,i2,\ldots,ik\},p}, S_{\{i1,i2,\ldots,ik\},p})$$

So the right hand side of Equation 3 may be computed directly by maintaining $Z_p=[Z_{\{1\},p}, Z_{\{2\},p}, \ldots, Z_{\{n\},p}]$ for $p=1, 2, \ldots, r$.

Equation 4, along with the above technique, may be used to design a tree-based divide and conquer strategy that first checks the possible existence of any significant correlation coefficient among a set of data columns before actually checking out every pair-wise coefficients. If the test turns out to be negative then the corresponding correlation coefficients are discarded for further consideration. The sparse-correlation matrix computation technique may be expanded to a stream data environment for monitoring the correlation difference matrices.

The following is pseudo code of a fast computation of sparse correlation matrices algorithm.

//L is a list of features and Coeffs is a list of

//correlation coefficients whose absolute value is greater

//than threshold.

```
Compute_Correlation(L, Coeffs, threshold) {
  if L contains only two elements a and b {
    c=Correlation(a,b);
    if(abs(c)>threshold)
      Append (Coeffs, c);
  }
  else {
    if (Contains_Significant_Coeffs(L, threshold)==TRUE) {
      L1=first_half(L);
      L2=second_half(L);
      if (Contains_Significant_Coeffs(L1, threshold)== TRUE)
        Compute_Correlation(L1, Coeffs, threshold);
      if (Contains_Significant_Coeffs(L2, threshold)=TRUE)
        Compute_Correlation(L2, Coeffs, threshold);
      if (Contains_Significant_Coeffs(L1, L2, threshold)= TRUE)
        Compute_Correlation(L1, L2, Coeffs, threshold);
    }
  }
  return;
}

Compute_Correlation(L1, L2, Coeffs, threshold) {
  L=L1 U L2;
  if L contains only two elements a and b {
    c=Correlation(a,b);
    if (abs(c)>threshold)
      Append (Coeffs, c);
  }
  else {
    L11=first_half(L1); L12=second_half(L1);
    L21=first_half(L2); L22=second_half(L2);
    if (Contains_Significant_Coeffs(L 11, L21, threshold)= TRUE){
      Compute_Correlation(L11, L21, Coeffs, threshold);
    if (Contains_Significant_Coeffs(L11, L22, threshold)= TRUE){
      Compute_Correlation(L11, L22, Coeffs, threshold);
    if (Contains_Significant_Coeffs(L12, L21, threshold)= TRUE) {
      Compute-Correlation(L12, L21, Coeffs. threshold);
    if (Contains_Significant_Coeffs(L12, L22, threshold)= TRUE){
      Compute_Correlation(L12, L22, Coeffs, threshold);
  }
  return;
}

Contains_Significant_Coeffs(L, threshold) {
  E=estimate_sum_of_Variance_square(L);
  if (E>threshold^2)
    Return TRUE;
  else
    Return FALSE;
}

Contains_Significant_Coeffs(L1, L2, threshold) {
  E=Median_Estimate_sum_of_Variance_square (L1 U L2);
  E1=Median_Estimate_sum_of_Variance_square (L1);
  E2=Median_Estimate_sum_of_Variance_square (L2);
  if (E-E1-E2>threshold^2)-
    return TRUE;
  else
    return FALSE;
}

Median_Estimate_sum_of_Variance_square (L) {
  for i=1 to numTrials
    E[i]=estimate in equation (1) for L
  end
  return median(E);
}
```

Consider a multi-attribute data stream scenario where each time stamp is associated with a window of observations from the stream data. Let $\text{Var}(S^t_{\{i1,i2,\ldots,ik\},p})$ and $\text{Var}(S^{t+1}_{\{i1,i2,\ldots,ik\},p})$ be the terms from Equation 2 defined over two consecutive data windows at time t and t+1. Now define, $$\Delta^{t+1}_{\{i1,i2,\ldots,ik\},p} = \text{Var}(S^{t+1}_{\{i1,i2,\ldots,ik\},p}) - \text{Var}(S^t_{\{i1,i2,\ldots,ik\},p})$$

Now the following is written, $$\Delta^{t+1}_{\{i1,i2,\ldots,ik\},p} = \sum_{l,q} \sigma^{t+1}_{l,p} \sigma^{t+1}_{q,p} Corr(x^{t+1}_l x^{t+1}_q) - \sum_{l,q} \sigma^{t}_{l,p} \sigma^{t}_{q,p} Corr(x^{t}_l x^{t}_q)$$

If the randomly generated vectors remain invariant across the two different windows, i.e. then the following is written:

$$\sum_{p=1}^{r} (\Delta^{t+1}_{\{i1,i2,\ldots,ik\},p}) = \sum_{l,q} (Corr(x^{t+1}_l x^{t+1}_q) - Corr(x^{t}_l x^{t}_q))^2$$

This may be used to directly look for significant changes in the correlation matrix. It is noted that the difference correlation matrix (i.e. the changes in the matrix) is usually very sparse since most of the time vehicle systems do not perform unusually; rather they work following well understood principles or mechanical and electrical engineering.

First, the problem of monitoring the correlation matrices computed from different data windows sampled from the data streams is considered. The performance of the naive and the proposed algorithm is compared in correctly detecting the following scenarios:

a) No changes in the correlation matrix over two consecutive data windows sampled from the streams.

b) No significant changes in the correlation matrix. Note that this is different from the previous scenario since in this case the correlation matrices are not identical although the changes are insignificant.

c) Detecting significant changes in the correlation matrix.

Figure 3:
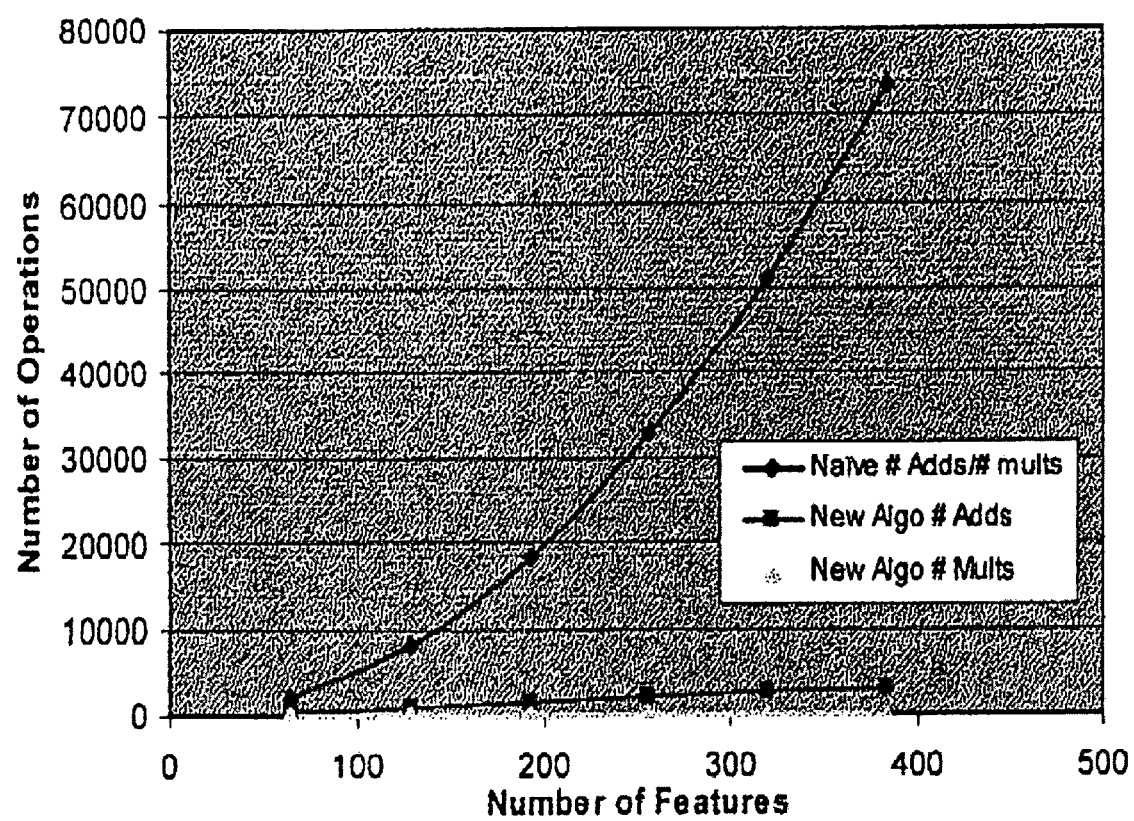
FIG. 3 shows the number of multiplications and additions performed by the naive and the proposed algorithms for correctly detecting no significant changes in the correlation matrix.

FIG. 3 shows the number of multiplications and additions performed by the naive and the proposed algorithms for correctly detecting no significant changes in the correlation matrix.

Monitoring the changes in the correlation matrix requires detecting no significant changes. The objective is to study the performance of the proposed algorithm when the correlation matrix is invariant. Experiments are performed using data stream windows producing same correlation matrices. The algorithm works very well, as suggested by the analytical results. It always identifies no change by performing the very first test at the root node of the tree. As a result the running time is constant compared to the quadratic order running time for the naive approach. As the FIG. 3 shows, the performance of the proposed algorithm is significantly better than that of the naive approach.

FIG. 4 shows the number of multiplications and additions (with a scaling factor of number-of-data-rows) performed by the proposed algorithms for correctly detecting no significant changes in the correlation matrix. The threshold value is 0.6. The number of additions/multiplications should be scaled by a factor equal to the number of data rows used for computing the correlation matrix.

Next consider the scenario where the correlation matrices are slightly different, resulting in a correlation-difference matrix that is not a null matrix but it does not contain any significantly changed (with respect to the given threshold) coefficient either. FIG. 4 shows the performance of the proposed algorithm for overlapping windows from the stream with insignificant but non-zero changes. The naive algorithm requires (2016×number-of-data-rows) multiplications and additions. The algorithm detects no significant changes with approximately half the number of additions and very small fraction of multiplications.

FIG. 5 shows the number of multiplications and additions performed by the naive and the new algorithm for correctly detecting that some of the entries of the correlation matrix have significantly changed and identifying the portions of the matrix with the significantly changed coefficients. Numbers of multiplications and additions should be scaled as in FIG. 4.

Figure 6:
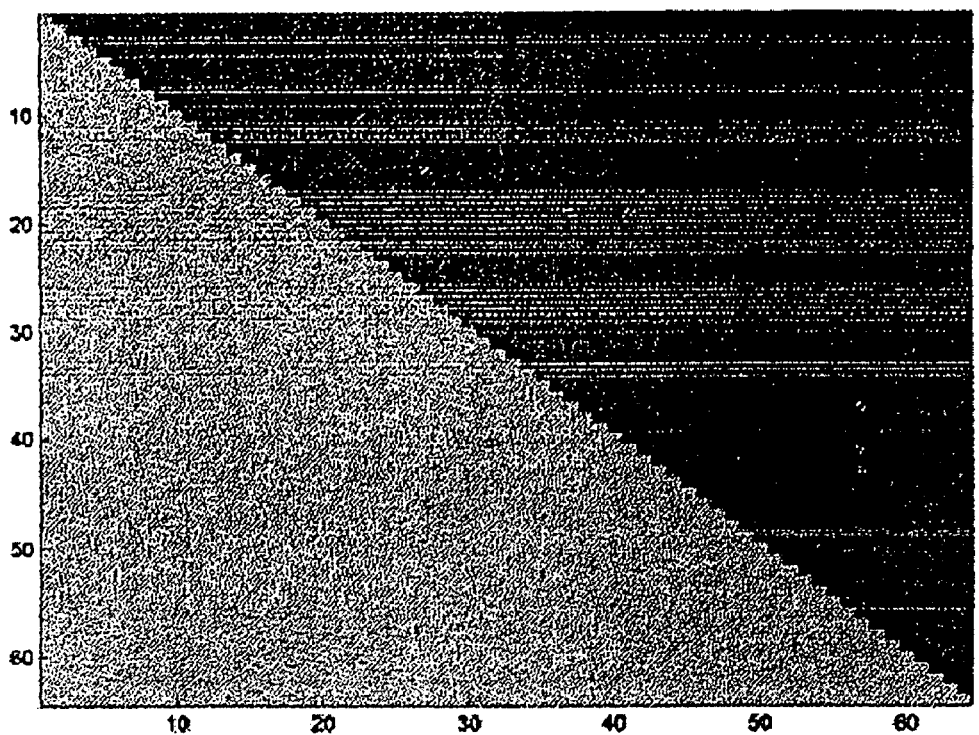
FIG. 6 shows the 64×64 dimensional correlation-difference matrix with the significant correlation coefficients and their gradual identification using the algorithm's divide and conquer strategy.

FIG. 6 shows the 64×64 dimensional correlation-difference matrix with the significant correlation coefficients and their gradual identification using the algorithm's divide and conquer strategy. Six bright dots represent the significant entries.

Next, the problem of detecting significant changes when some of the coefficients in the correlation matrix have changed beyond the given threshold is considered. In this situation, the algorithm has the two following goals:

a) Detect that something has indeed changed in the correlation matrix.

b) Identify the portions of the matrix that are likely to contain the significantly changed coefficients.

Experiments are performed with overlapping windows of data where the difference-correlation containing exactly 6 significant entries with magnitude of the difference greater than 0.6.

In all the experiments reported here, the algorithm returns the correct answer for the first problem (a) listed above. Experiments are carried out with finite resource constraints. FIG. 5 shows the number of multiplications and additions when the algorithm is allowed to explore only 8 nodes in the tree. Even with this restriction on computation, the algorithm could detect the regions of the correlation matrix with most of the significantly changed coefficients. FIG. 6 shows the 64×64 dimensional correlation-difference matrix. Since the matrix is symmetric, the matrix is divided into two different regions with different shadings. The right-upper triangle shows 4 different regions (with different color shades) corresponding to the regimes defined by the nodes of the tree constructed by the algorithm. Six dots in the right-upper triangle correspond to the significant entries. The algorithm correctly discards the darker upper-rightmost region since it does not contain any significant entry. Note that the nodes selected by the algorithm cover all the six significant coefficients.

Next, the problem of computing sparse correlation matrices is considered. This is relevant to vehicle data stream mining application. However, it is also equally relevant to any other application where large sparse correlation matrices must be computed efficiently.

In order to study the performance of the algorithm in detecting significant coefficients from a sparse correlation matrix experiments are performed where the sparseness may be controlled. The first set of experiments reported here uses a controlled data set generated using correlated stock market data and randomly generated uncorrelated data. More specifically the highs for each day for a period of 1 year for each ticker are considered. Only tickers with all 252 values are considered. 50 randomly generated data vectors and 6 stock market data vectors are used in order to obtain a data set with a total of 56 attributes. In order to make a fair assessment, the order of the features are randomly shuffled. Therefore, the correlation matrix is a 56×56 in this case and traditional method of computing the correlation coefficients that are significant require computing all the n(n−1)/2 coefficients which is 1540 in this case. The threshold $\theta^2$ is fixed to be 0.49, i.e. coefficients are desired whose absolute value is at least 0.7. In this case there were 10 significant coefficients. The results are observed as the numbers of random vectors, r, used are increased. For each value of r, the algorithm is run 25 times. The following was observed:

1. The average number of significant coefficients that are found.
2. The number of times (out of the 25 trials) all the 10 significant coefficients are obtained.
3. The number of times at least 8 out of the 10 significant coefficients are obtained.
4. The number of times at least 5 of the 10 significant coefficients are obtained.
5. The average size of the tree (or the total number of nodes in the computation tree).

Figure 7:
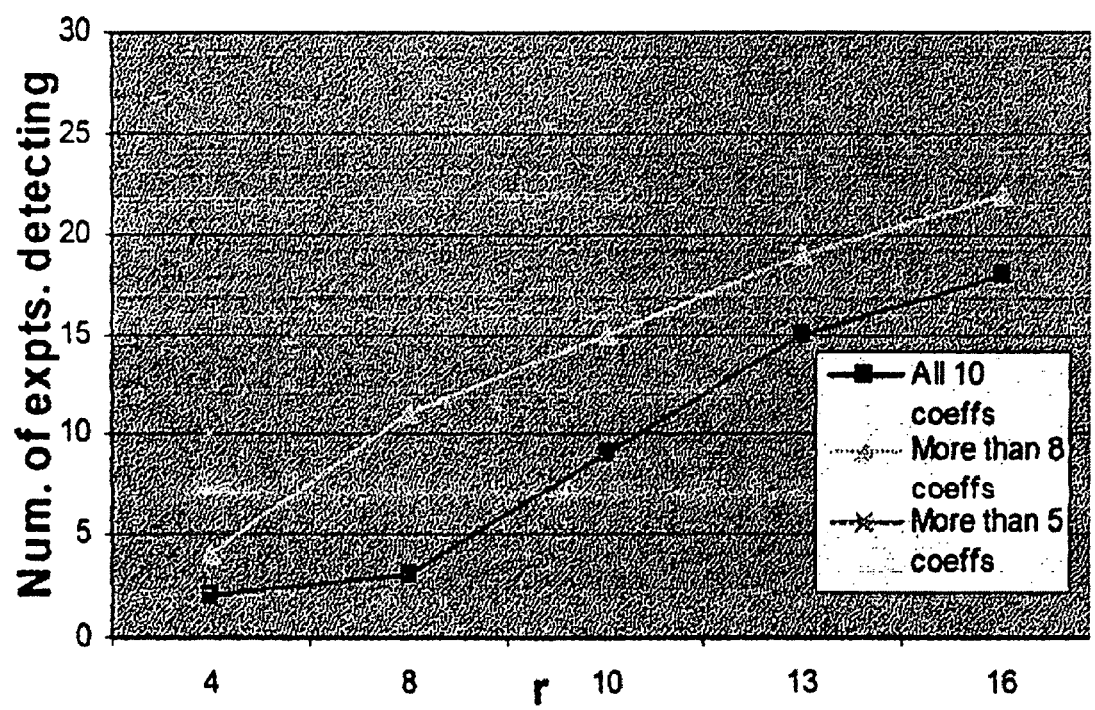
FIG. 7 shows the performance of the algorithm in detecting the significant coefficients.

FIG. 7 shows the performance of the algorithm in detecting the significant coefficients. Total number of trials is 25 and the correlation matrix contains 10 significant coefficients.

More experimental results are considered using vehicle data stream and offer some more data to quantify the computational characteristics of the proposed approach. This data is collected from a 2003 Ford Taurus model. The particular data set used here has 48 features and 831 rows. A threshold value $\theta^2 = 0.85$ is used. This resulted in a correlation matrix with 30 significant coefficients among a total of 1128 unique entries. In other words, the matrix contains 1128−30=1098 insignificant coefficients. Computing all the C=1128 coefficients explicitly would require Cm=1128×831=937,368 multiplications and the same number of additions.

Let S be the significant number of coefficients found by the algorithm. S gives a measure of accuracy; let C' be the number of exact coefficients computed at the leaves of the tree constructed by the algorithm; let D be the number of nodes in the tree. Therefore, D−C' gives the number of nodes in the tree where the proposed fast-estimate-test is performed. Let A and M be the total number of column additions and multiplications. Parameters M and A give a measure of how fast the method is compared to C, the number of correlation coefficients computed by the standard way.

FIG. 8 shows the performance of the proposed algorithm in detecting the significant coefficients using the vehicle data.

FIG. 9 shows the performance of the proposed algorithm in detecting the significant coefficients using the vehicle data.

Additional experiments are performed using the vehicle data with artificially controlled feature-space and sparseness of the correlation matrix. A data set is generated using 50 random vectors and 10 real data features. The ordering of the columns is randomly chosen each time. The results are reported over 10 trials. The correlation matrix contains a total of 22 significant coefficients for a threshold value of $\theta = 0.7$. The matrix contains a total of C=60(60−1)/2=1770 unique coefficients. FIGS. 10 and 11 present the experimental results.

FIG. 10 shows the performance of the proposed algorithm in detecting the significant coefficients using the vehicle data with artificially controlled sparseness of the correlation matrix.

FIG. 11 shows the performance of the proposed algorithm in detecting the significant coefficients using the vehicle data with artificially controlled sparseness of the correlation matrix.

The system of the present invention is a real-time vehicle data stream mining and monitoring system. The system is a distributed data mining system designed for mobile applications. The system has many other applications in different domains where monitoring time-critical data streams is important and central collection of data is an expensive proposition.

Figure 12:
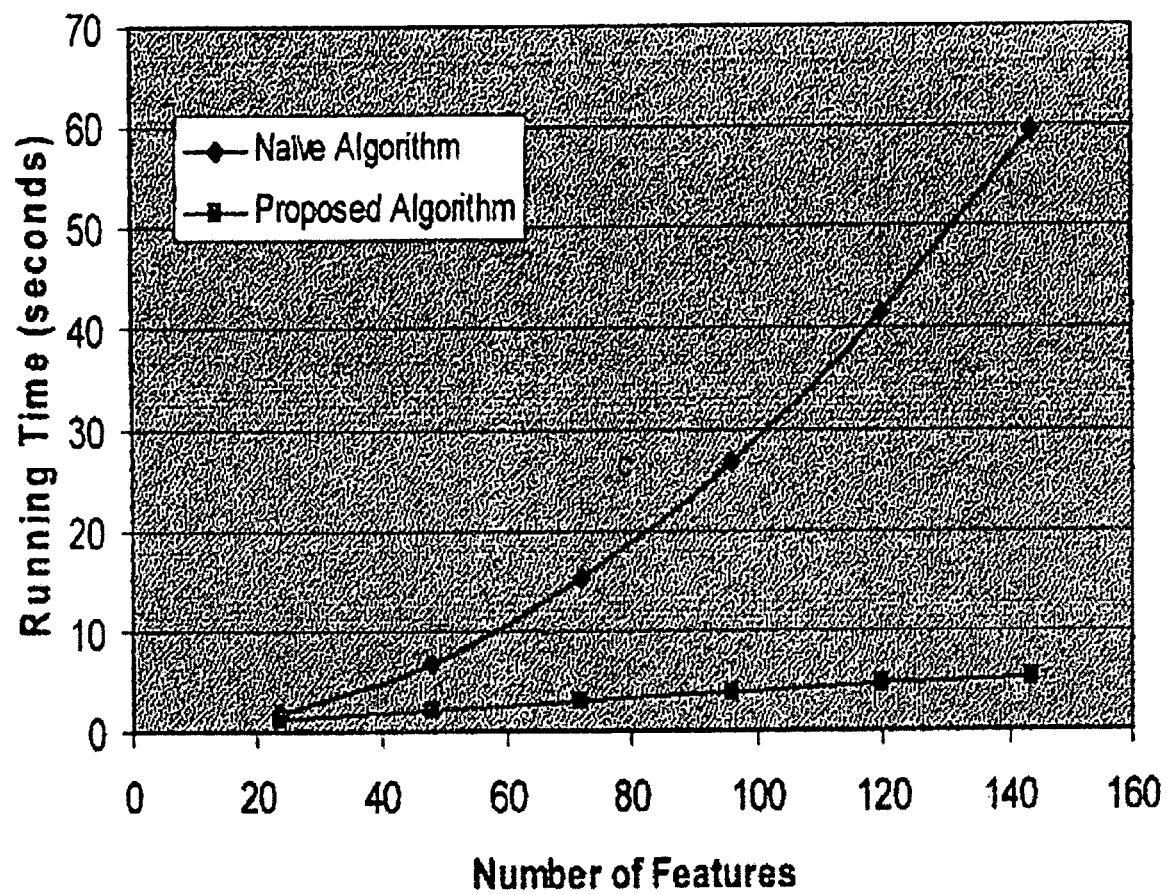
FIG. 12 shows a comparison of the running time of the proposed and the naive algorithm for detecting no changes in the correlation matrix.

FIG. 12 shows a comparison of the running time of the proposed and the naive algorithm for detecting no changes in the correlation matrix.

The system of the present invention contains the algorithm and it plays a critical role in the real-time performance of the vehicle on board module for data analysis. The technique adopts a divide-and-conquer strategy that makes use of a test to check whether or not a subset of correlation coefficients contains any significant coefficient. The test allows pruning out those subsets of coefficients that do not appear to contain any significant one. The technique is particularly suitable for efficiently monitoring changes in coefficient matrices and computing large sparse correlation matrices.

FIG. 12 shows the comparative running time of the proposed and the naive algorithm on a Dell Axim PDA. The experiments are performed for increasing number of features. The algorithm detects no changes in the correlation matrix at a very minimal cost saving several seconds of clock time. A few seconds of saving in running time is a major achievement in a resource-constrained environment like what the on-board module of the present invention uses.

The accuracy of the algorithm depends on the value of r, i.e. number of different randomized trials. For relatively larger values of r, the accuracy is excellent; however, the running time goes up accordingly. The performance of the algorithm also depends on the overhead necessary for maintaining and manipulating the tree structure. Therefore, paying attention to the systems issues is important, particularly for the run-time performance on-board a PDA-like device.

Figure 13:
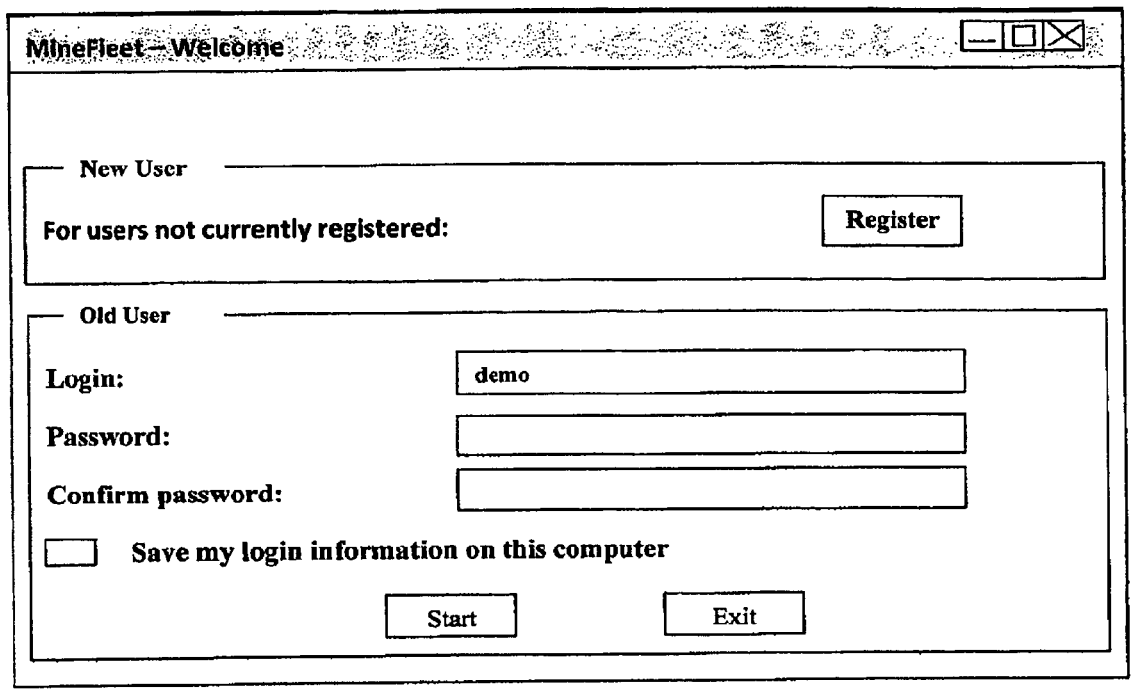
FIG. 13 shows an initial screen that comes up when the control center first starts.

FIGS. 13-26 show a preferred embodiment of the present system. The program uses mobile and distributed data stream management and mining algorithms for mining continuously generated data from different components of a vehicle. FIG. 13 shows an initial screen that comes up when the control center first starts. The user logs in or if they don't have an account they must register to create one.

FIG. 14 shows a main window of the control center that comes up when the user presses start on the welcome screen. From here the user may add new vehicles, create, start, and stop analytics for a vehicle, and view analytics.

FIG. 15 shows a window that appears when the user selects the vehicle menu from the main window of the control center. From here the user add a new vehicle to the list of vehicles to manage.

Figure 16:
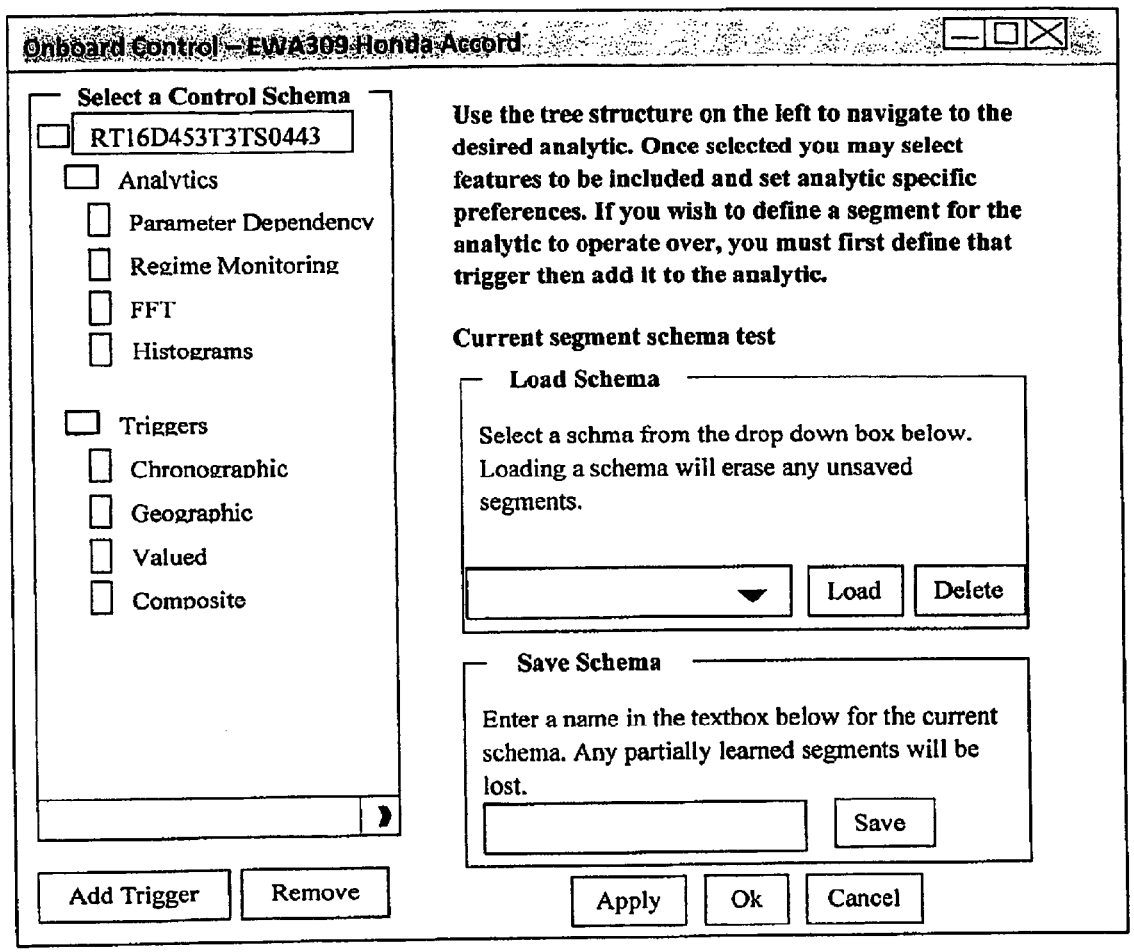
FIG. 16 shows a window that is displayed when the user selects a vehicle from the list on the main window of the control center and then clicks on onboard control.

FIG. 16 shows a window that is displayed when the user selects a vehicle from the list on the main window of the control center and then clicks on onboard control. When the user selects a different node in the tree on the left a new panel is displayed on the right. The root node is initially selected for displaying the panel to load and save schemas. A schema is a way to group together the current settings of the onboard control window and save them so the user may load them again at a later time.

Figure 17:
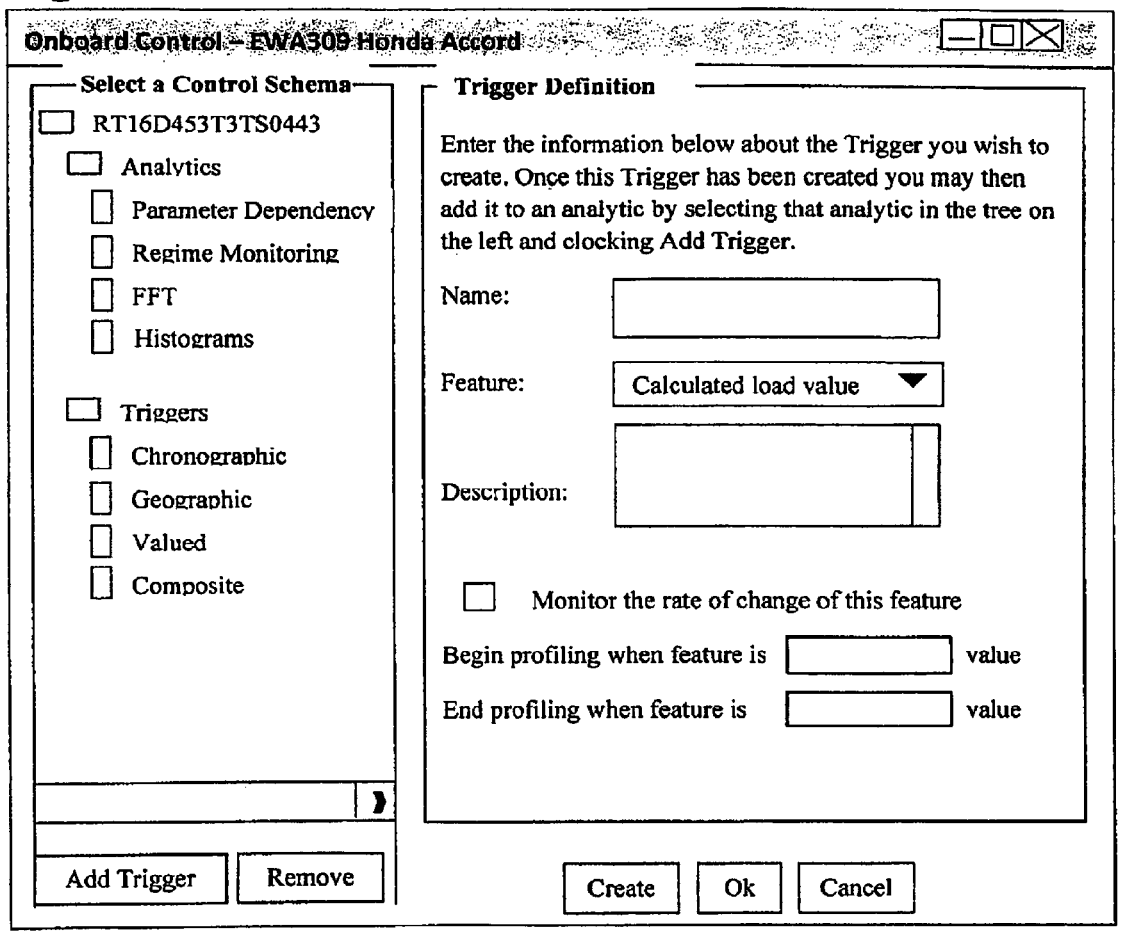
FIG. 17 shows a panel that is displayed when the user selects the "valued" node under the triggers category in the tree on the left.

FIG. 17 shows a panel that is displayed when the user selects the "valued" node under the triggers category in the tree on the left. The user must give the trigger a name and description, then choose a feature to associate the trigger with, and then choose values to start and stop monitoring the feature they selected.

Figure 18:
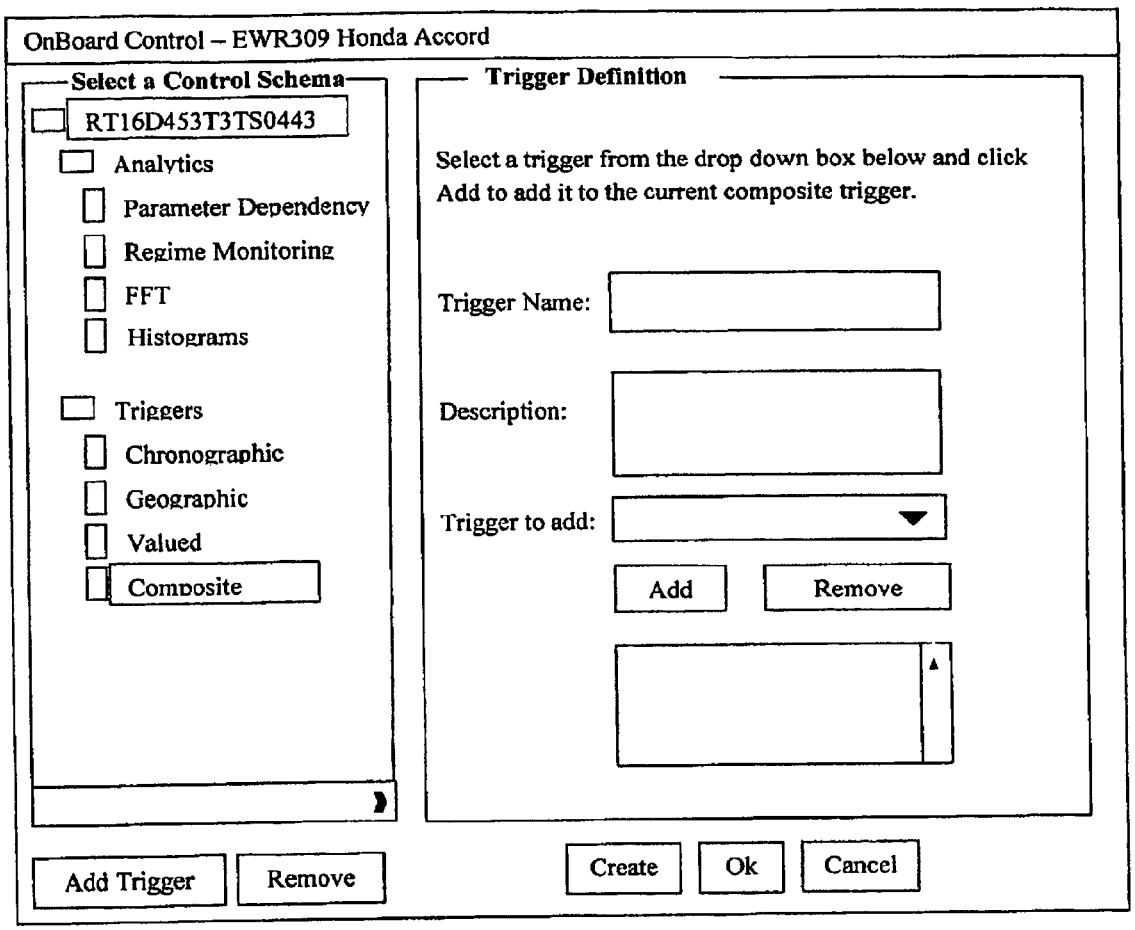
FIG. 18 shows a panel that is displayed when the user selects "composite" under the triggers category in the tree on the left.

FIG. 18 shows a panel that is displayed when the user selects "composite" under the triggers category in the tree on the left. A composite trigger is a combination of one or more triggers that already exist. The combo box next to the label "trigger to add:" contains the names of all the current triggers. The user adds them to the current composite trigger by clicking add.

Figure 19:
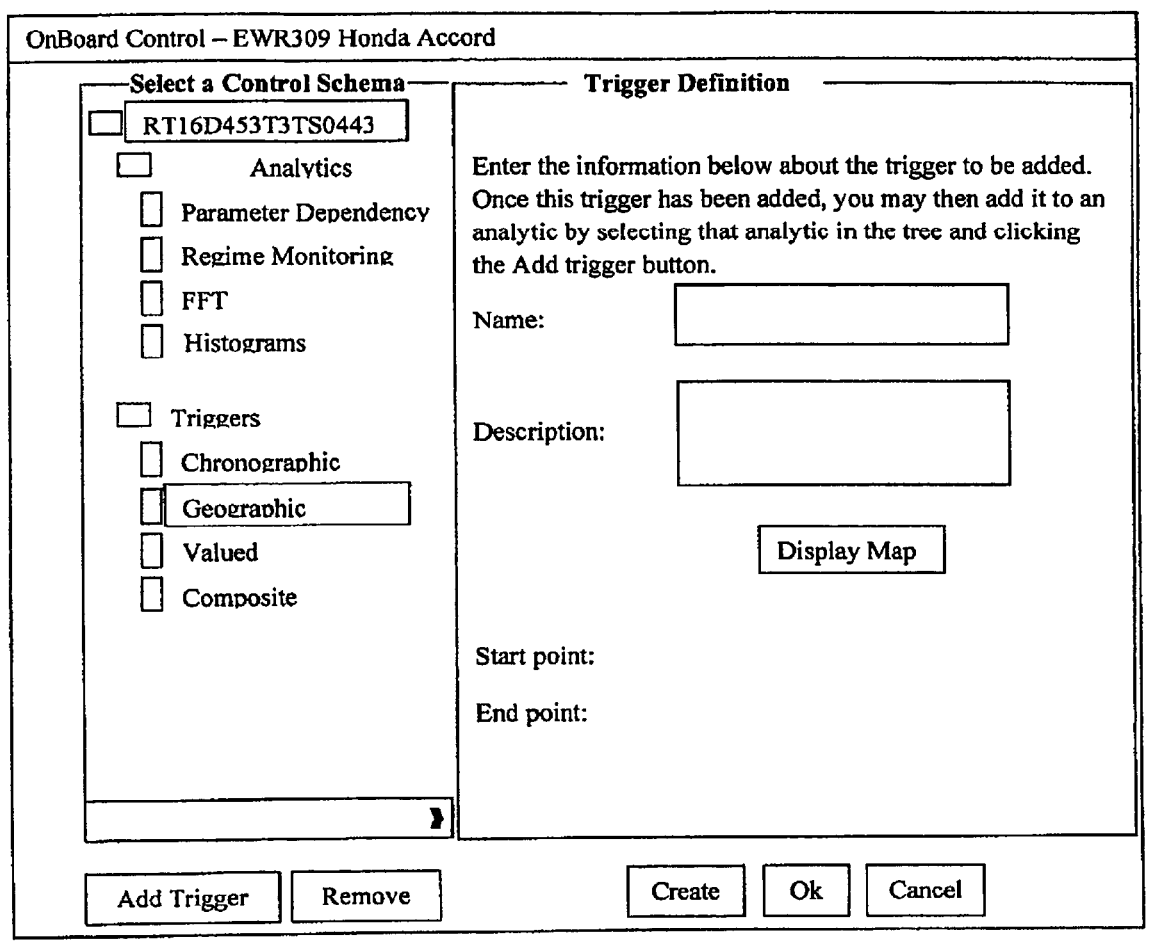
FIG. 19 shows a panel that is displayed when the user selects "geographic" under the triggers category in the tree on the left.

FIG. 19 shows a panel that is displayed when the user selects "geographic" under the triggers category in the tree on the left. A geographic trigger monitors the vehicle between two geographic points. When the user clicks display map, he or she sees a new screen with a map where two points may be selected.

Figure 20:
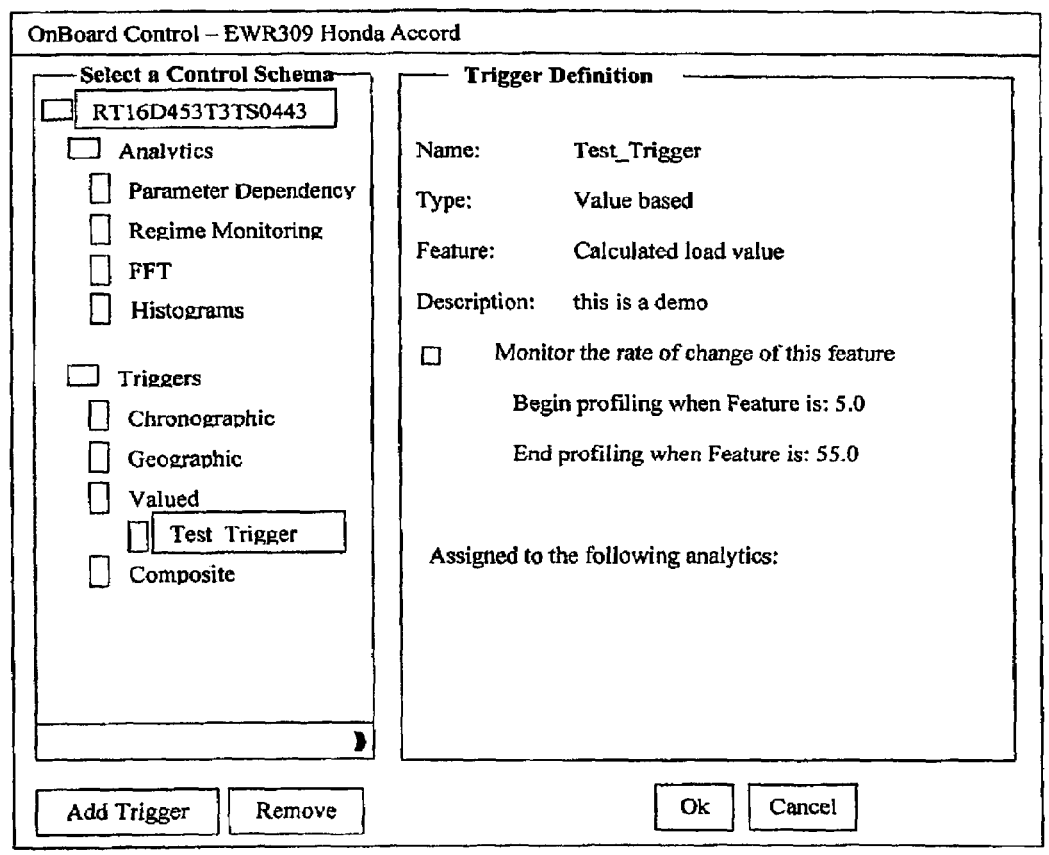
FIG. 20 shows a panel that is displayed after a trigger has been created a new node in the tree.

FIG. 20 shows a panel that is displayed after a trigger has been created a new node in the tree. The new trigger is added underneath the type of trigger that was created. When selected, this node displays information for that trigger.

Figure 21:
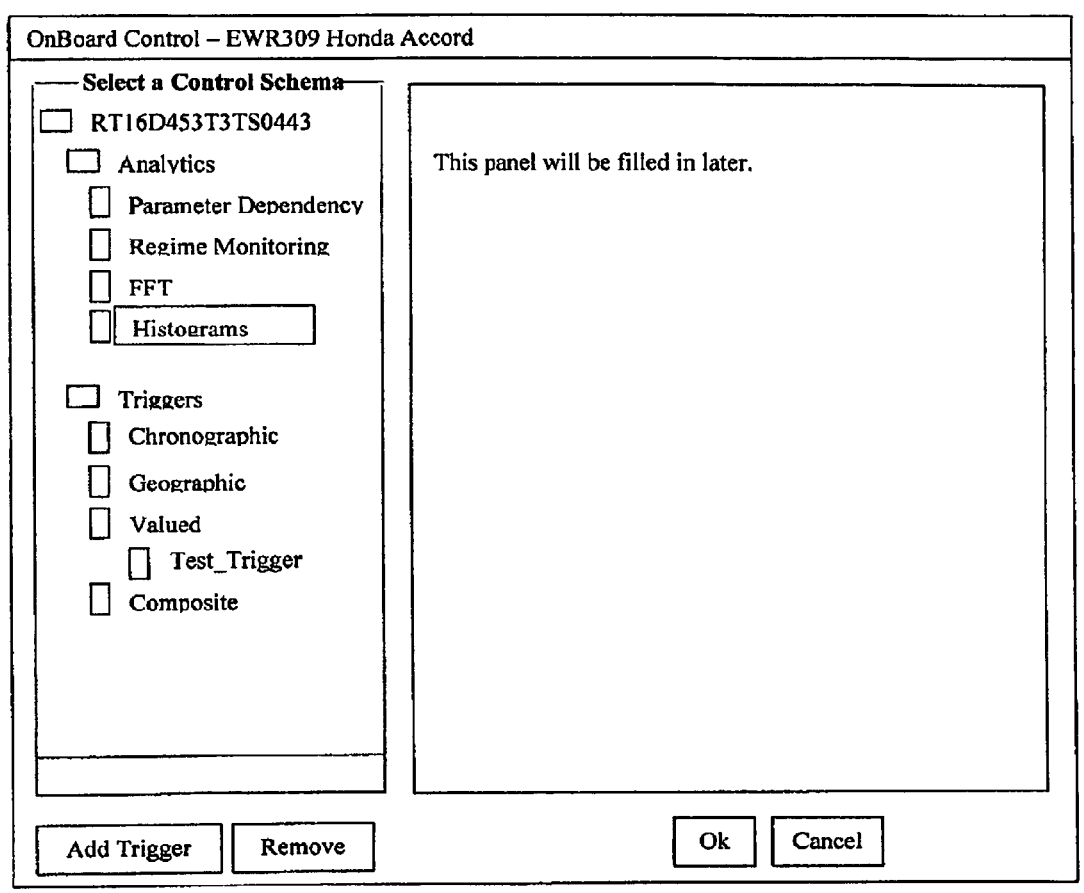
FIG. 21 shows a panel that is displayed when the user has created a trigger and a subsequent segment is created for that trigger.

FIG. 21 shows a panel that is displayed when the user has created a trigger and a subsequent segment is created for that trigger. When one of the nodes underneath the analytics node in the tree on the left is selected the add trigger button on the bottom left becomes enabled. By clicking this button a new window appears to create a segment for the type of analytic that is selected in the tree.

FIG. 22 shows a panel that is displayed when "histogram" is selected in the tree and the add trigger button is clicked. The user must give the segment a name, a trigger to associate with, and a feature. A learning definition must also be specified. The three types of learning definitions are convergence, repetition, and elapsed time. On the right hand side the user is able to create a custom histogram with the buckets they define. Clicking add class creates a new row in the table that represents a new bucket in the histogram.

FIG. 23 shows a panel that is displayed when "regime monitoring" or "parameter dependency" is selected in the tree on the left of the onboard control window and the add trigger button is clicked. The left hand side of this window is mostly the same as the histogram window, but now on the right there is a table displaying the features of the vehicle and checkboxes allowing the user to select/deselect included features.

FIG. 24 shows a panel that is displayed when "FFT" is selected in the tree on the left of the onboard control window. The user must select a trigger and FFT feature to associate with this segment and then choose a learning definition.

Figure 25:
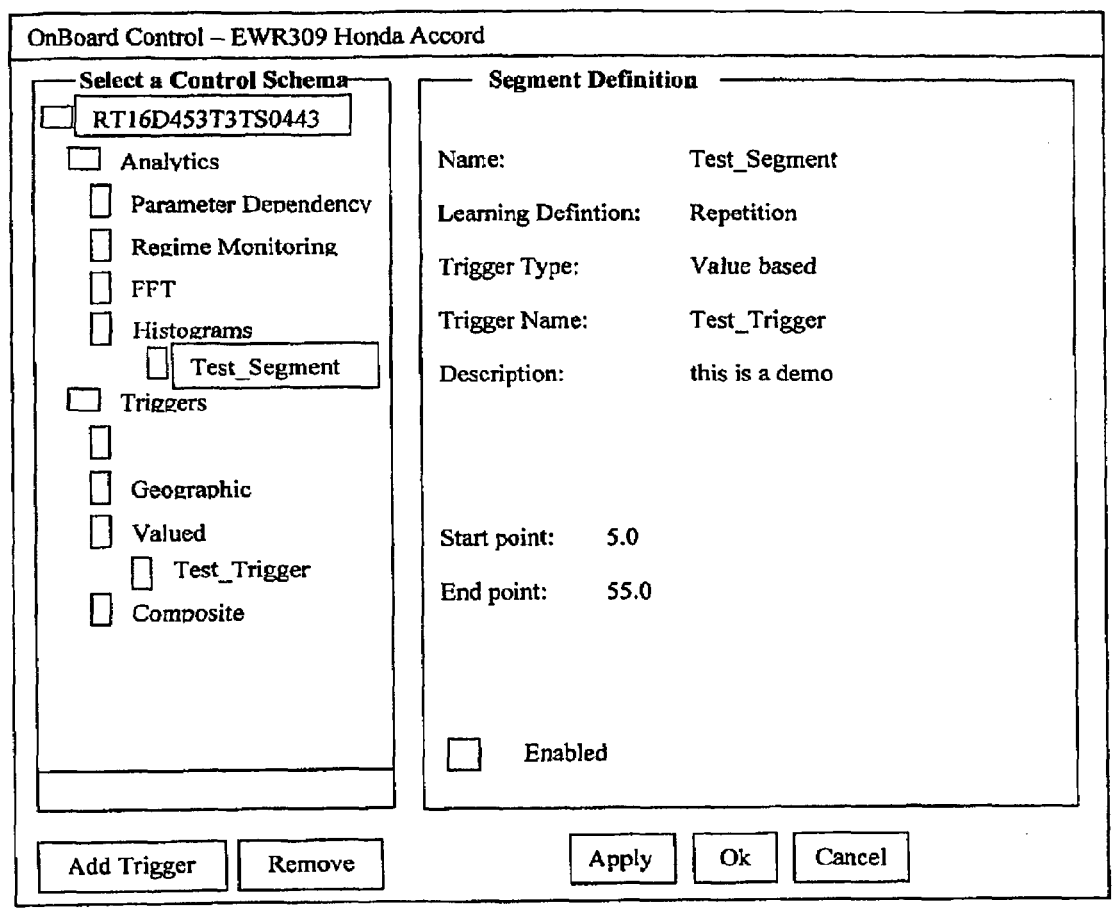
FIG. 25 shows a new node that is inserted underneath the type of segment created.

FIG. 25 shows a new node that is inserted underneath the type of segment created. This node displays the information about that segment as well as lets the user enable or disable that segment. When the segment is initially created it does not start running. The user must go to the above window, check the checkbox that says enabled, and click apply to start the segment.

Figure 26A:
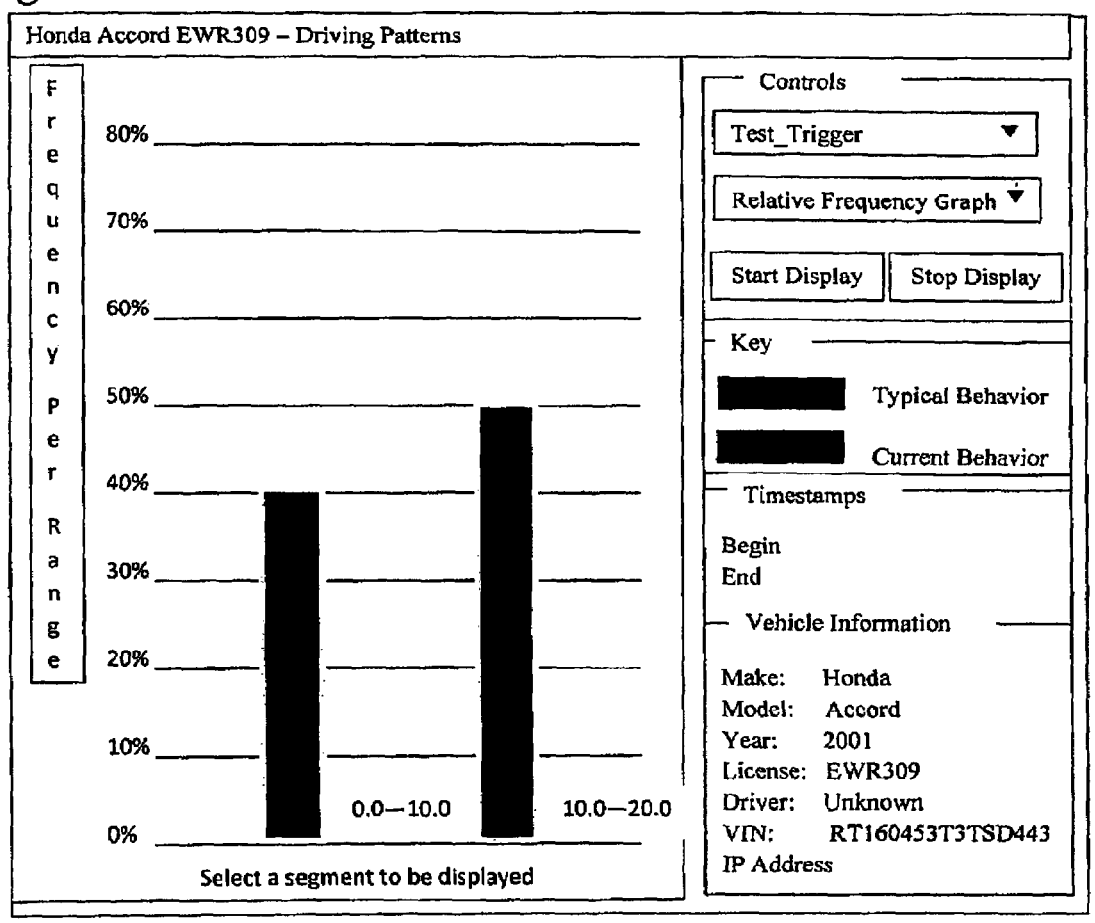
FIG. 26A shows a histogram created by a user.

FIG. 26A shows a histogram created by a user. Once a histogram segment has been created the user may close the onboard control window and click on the driving patterns icon on the top of the main window of the control center. Clicking that icon displays the above window. The combo box entitled "controls" lists the available histogram segments for viewing. The user selects a segment and then clicks start display and a histogram appears on the left on hand side that is continuously updated as data is received from onboard the vehicle.

Figure 26B:
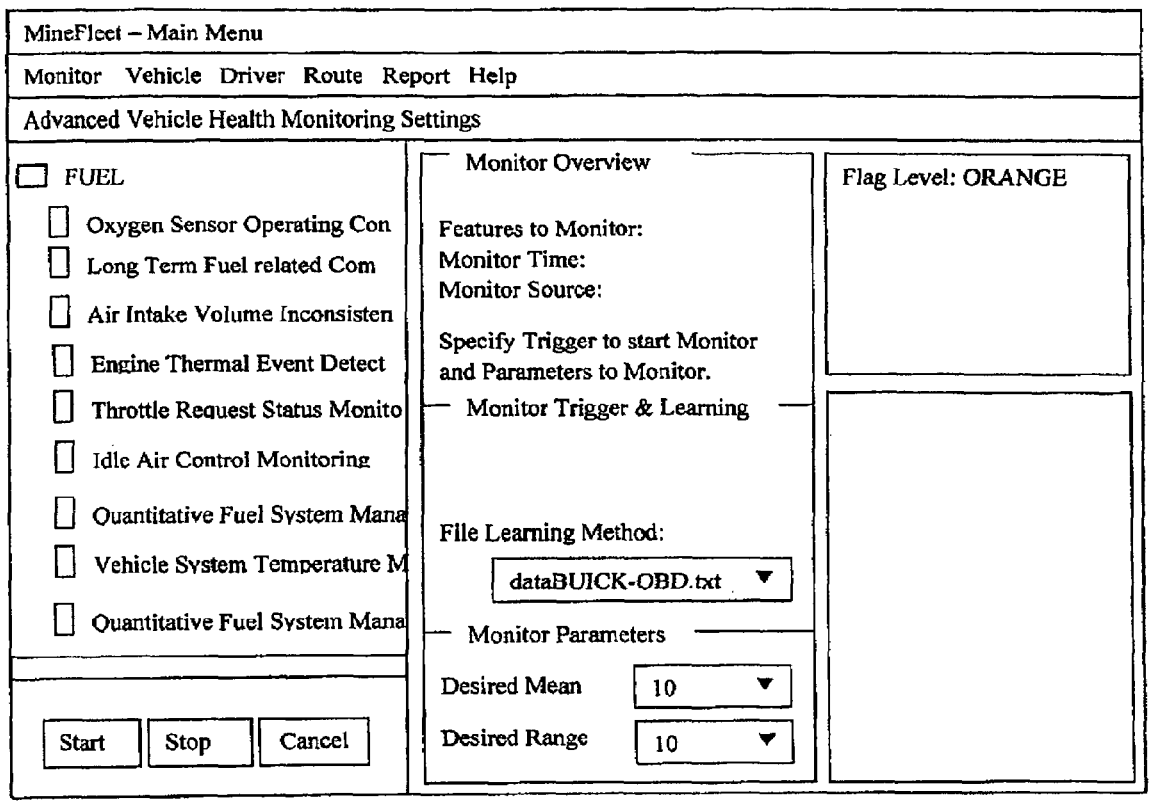
FIG. 26B shows a module for monitoring various vehicle subsystems.

FIG. 26B shows a module for monitoring various vehicle subsystems. The system of the present invention performs tests to check for any problems in various vehicle subsystems.

The following are example lists of tests that are illustrative. Other tests are possible.

Fuel system: oxygen sensor operating condition monitoring; long term fuel related combustion efficiency monitoring; air intake volume inconsistency monitoring; engine intake vacuum inefficiency monitoring; engine thermal event detection; throttle request status monitoring; idle control monitoring; intake air management monitoring; quantitative fuel management monitoring; vehicle system temperature management monitoring; and quantitative fuel system management monitoring.

Exhaust system: combustion temperature inequality monitoring, and combustion temperature control decay monitoring.

Ignition system: vehicle ignition system voltage monitoring, spark control monitoring, and vehicle operating system voltage monitoring.

The present invention utilizes an efficient randomized algorithm for distributed principle component analysis from heterogeneous data. Principal Component Analysis (PCA) is a popular data mining task frequently used for constructing low dimensional representations of data. The distributed inner product computation technique lays the foundation of the distributed PCA. The distributed PCA and the distributed inner product computation technique are used to compare the observing sequence of driving patterns with typical patterns computed and stored at the central monitoring station. This technique is also used for comparing driving characteristics of different vehicles connected over a distributed wireless network in real time.

PCA has problems in a distributed environment with heterogeneous data where different sites observe different attributes. The present algorithm is more efficient in communication and computation compared to the current known techniques for performing distributed PCA from heterogeneous data. The current algorithm makes use of a probabilistic, distributed inner product computation technique that has applications in computing Euclidean distance, correlation coefficient from data vectors located at different sites. The algorithms are particularly suitable for large-scale distributed applications such as object tracking in sensor networks, identifying similar objects from multiple virtual observatories with massive data tables where data centralization may not be desirable.

Principal Component Analysis (PCA) is a widely practiced technique for identifying the underlying maximally variant directions of the data that may be used for constructing a low dimensional representation. Performing PCA from distributed data is an important component of an increasing number of applications. Examples include target identification in sensor networks, clustering distributed data from a collection of large repositories such as virtual observatories and business data warehouses. PCA may require computation of inner product, Euclidean distance, and covariance matrix. These statistical computing primitives are often necessary for comparing distributed data objects (e.g. user profiles, passenger records) that are necessary in many security related data mining and management applications.

A problem exists in performing distributed PCA from heterogeneous data where different sites observe different attributes. The Collective PCA (CPCA) technique works using local PCA followed by a sampling based technique for computing the covariance matrix at the central site. The CPCA technique suffers from several problems. CPCA tries to minimize communication overhead using two techniques: (1) Reduction of attribute-space through local PCA at different locations and (2) reduction of data rows through sampling. In many applications, the locally observed data may not capture the variation of the data using a relatively small number of dimensions and therefore local PCA may not really offer a good deal of feature reduction. Moreover, sampling-based reduction of the data rows do not normally work well in many applications such as outlier detection from distributed data. As a result, CPCA may demand considerable amount of data transmission (although possibly quite less compared to the centralized approach) in some applications.

PCA is a statistical technique for analyzing multivariate data. It involves linear transformation of a collection of related variables into a set of principal components. All the principal components are statistically uncorrelated and individual principal components are ordered with respect to the statistical variance of that component. Consider the random vector $X=(X_1, X_2, \ldots, X_n)^2$ with mean $E[X]=0$ and covariance matrix $Cov[X]=E[X^TX]=\sigma_x$. The $i^{th}$ principal component of X is a linear combination $Y_i = X a_i^T$, where $a_i$ is a unit eigenvector of $\sigma_x$ corresponding to the $i^{th}$ largest eigenvalue $\lambda_i$. In this case, $Y_i$ is uncorrelated with the previous principal components $(Y_1, Y_2, \ldots, Y_{i-1})$ and has maximum variance. In general, the goal is to represent X by means of a small set of principal components (dimensionality reduction). Let $Y' = [Y_1, \ldots, Y_k]$ be the first k principal components of X, where $k \ll n$. These principal components may be used to obtain a reasonable approximation of the original data as follows: $X'=Y' A'^T$ where the columns of A' consist of the first k eigenvectors of $\sigma_x$.

PCA is frequently used in data mining applications for constructing a low dimensional representation of the data. This low dimensional representation of the data in turn may be used for clustering, outlier detection, and classification, just to name a few. As noted earlier, PCA is no less important in distributed data mining applications.

The following is a general picture of Distributed Data Mining (DDM) algorithms, a relatively new technology. First of all, DDM algorithms try to analyze the data in a distributed manner without necessarily downloading everything to a single site (which is usually necessary for a regular centralized data mining system). DDM algorithms usually offer approximate and sometimes exact techniques for decomposing the data analysis task resulting in a distributed execution of the mining process that requires relatively less (sometimes little or none) data communication. A class of distributed data mining techniques is also explicitly designed for preserving data privacy.

FIGS. 27, 28 and 29 show a distributed heterogeneous data environment consisting of two data sites. Here site 1, FIG. 27, has observations for variables $x_1$ and $x_2$, whereas site 2, FIG. 28, has observations for attributes $x_2$ and $x_3$. The goal is to compute the correlation matrix involving all these attributes. A naive approach to mine this distributed data would be to first join (or aggregate) the two tables at a central site (see FIG. 29), using the common attribute $x_1$ and then use the standard technique to compute the correlation matrix from the combined data table. However, this may not be feasible when the data tables are large and stored at different locations. A scalable data mining system would require techniques that compute the exact or an approximation of the correlation matrix without necessarily downloading the whole data tables to a single central site.

In general, the overall objective of DDM algorithms is to analyze distributed data efficiently using computing, communication, and other resources distributed among different sites.

PCA has many natural applications in a distributed data mining application. For example, consider the problem of target identification and tracking in a sensor network. The goal is to quickly detect the objects, identify the sensors that are sensing the same object and track their movements in a collaborative fashion. This may require several different types of computations such as (1) computing the similarities between the data sequences observed at different sensors, (2) clustering the distributed data in a low dimensional projected space of principal components. Doing these computations in a centralized manner after downloading the data to a single site may be expensive.

Consider a distributed, heterogeneous environment, where the entire data matrix X is comprised of different smaller tables stored at some s different sites. Each site that stores a portion of the data matrix X stores some subset of the overall feature set. If the centralized version of the PCA approach were to be utilized, it would require that the data first be moved to a central site. From this centralized data, the eigenvalues/eigenvectors of the covariance matrix $X^TX$ of the global data matrix X would be determined. The transmission cost of moving the entire data set to a centralized location may be represented as O(mn), where m is the number of data samples (rows of the global data table X) and n is the total number of features (columns of the global data table X). Data transmission of this order may be prohibitive in many applications such as sensor networks, because of limited availability of resources like communication bandwidth and power supply. Therefore, distributed techniques for computing the distances matrices and the principal components that work in a distributed manner without necessarily downloading all the data to a single central location may be very useful in such applications.

There exists some prior work on distributed PCA. The Collective PCA (CPCA) algorithm is such technique that may be used for performing distributed PCA from heterogeneous data sets with limited communication of raw data. CPCA works by first performing local PCA and then sampling the locally projected data, followed by a global PCA at the central site. The specific steps are given below:

1. Perform local PCA at each site; project data along selected dominant eigenvectors.
2. Send a sample of the projected data along with the eigenvectors.
3. Combine the projected data from all the sites.
4. Perform PCA on the global data set, identify the dominant eigenvectors and transform them back to the original space.

This approach reduces communication overhead using two techniques: (1) Reduction of attribute-space through local PCA and (2) reduction of data rows through sampling. Although this approach may works for some applications, there are some problems. First of all, the degree of compression of the local attribute-space using local PCA may widely vary from application to application. In some applications, the locally observed data may not capture the variation of the data using a relatively small number of dimensions. Sampling works well for applications that need the general trend of the observed data. However, many distributed data mining applications (e.g. sensor networks) require detecting outlier activities and sampling-based may arguably have problems in detecting events that do not occur very frequently but very important for the application. Therefore, the reduction in communication overhead through sampling may also depend very much on the application. For applications that involve tasks like outlier detection, this approach may not provide a whole lot of reduction in communication overhead.

The present algorithm does not involve performing local PCA at each of the distributed sites. It also does not require sampling of the data rows. It is computationally a lot simpler. It also offers reduced communication overhead.

There also exist a collection of techniques for computing inner product from distributed data in a privacy-preserving manner. These algorithms are exact and usually require relatively high communication cost. The best among these algorithms runs with 2m communication cost, where m is the number of entries in each of the data vectors. This may not be acceptable in most bandwidth and energy constrained DDM application environments.

PCA involves computing the eigenvectors and eigenvalues of the covariance matrix in a multivariate problem. In a distributed situation with multiple sites observing different attributes, the main challenge is to compute the covariance matrix at a central location without downloading all the data. Consider two sites A and B each with a data vector $X_a=[a_1, a_2, \ldots, a_m]^T$ and $X_b=[b_1, b_2, \ldots, b_m]^T$. For the sake of simplicity, it is assumed that the data rows from sites A and B are associated based on their indices. For example, in a sensor network environment the index may be the timestamp associated with the observation. Define a new virtual site C that facilitates the computation of the inner product. It may be either sites A or B or a different site. Our objective is to compute the covariance matrix at site C. Once that is done, Eigen-analysis of the covariance matrix is performed using standard centralized techniques. A distributed algorithm for computing the covariance matrix is designed first.

Note that the covariance between $X_a$ and $X_b$ is defined as $$Cov(X_a, X_b) = \frac{\langle X_a, X_b \rangle}{m} - \mu_a \mu_b,$$

where $\mu_a$ and $\mu_b$ and $\sigma_b$ are the means of $X_a$ and $X_b$ respectively;

$$\langle X_a, X_b \rangle = \sum_{i=1}^{m} a_i b_i$$

is the inner product between $X_a$ and $X_b$. Therefore, in order to compute the covariance matrix, an algorithm for computing $\langle X_a, X_b \rangle$ is needed. If $X_a$ and $X_b$ belong to the same site then problem is trivial. However, if they are two different sites A and B then it becomes more challenging. An algorithm is presented to compute $\langle X_a, X_b \rangle$ when $X_a$ and $X_b$ belong to two different sites.

The present technique takes a randomized approach that exploits random data vectors. Assume that site C selects a pseudo-random number generator and a seed value. Site C then sends those to both A and B so that both the sites may generate the same sequence of random numbers. In real-life applications (e.g. sensor networks) it is assumed that the sites A and B are already equipped with random number generators. In that case site C simply sends the seed to A and B. Let $o_{1,p}, o_{2,p}, \ldots, o_{m,p}$ be this sequence of randomly and independently generated numbers such that $o_{i,p} \in \{-1, 1\}$. Now consider the following steps:

1. At site C initialize $Z_p=0$
2. At sites A and B initialize $z_{a,0,p}=z_{b,0,p}=0$
3. Compute $z_{a,i,p}=z_{a,i-1,p}+a_i o_{i,p}$ and $z_{b,j,p}=z_{b,j-1,p}+a_j o_{j,p}$.
4. Repeat step 3 at each site for i,j=1, 2, . . . , m.
5. Send $z_{a,m,p}$ and $z_{b,m,p}$ to the site C
6. Site C computes the scalar product $Z_p=z_{a,m,p} \cdot z_{b,m,p}$
7. Repeat steps 2-6 p=1, 2, . . . , n times and compute $$Z = \frac{1}{n}\sum_{p=1}^{n} Z_p$$

8. Z approximates the inner product for large values of n.

Next the correctness of this algorithm is proved. Proof of correctness:

Note that $$Z_p = z_{a,m,p} \cdot z_{b,m,p} = \sum_{i=1}^{m} a_i o_{i,p} \sum_{j=1}^{m} a_j o_{j,p} = \sum_{i=1}^{m} a_i b_i o_{i,p}^2 + \sum_{i \neq j} a_i b_j o_{i,p} o_{j,p}$$

Since $o^2_{i,p}=1$, $$Z_p = \sum_{i=1}^{m} a_i b_i + \sum_{i \neq j}^{m} a_i b_j o_{i,p} o_{j,p}$$

Now the following is written, $$Z = \frac{1}{n}\sum_{p=1}^{n} Z_p = \sum_{i=1}^{m} a_i b_i + \frac{1}{n}\sum_{i \neq j} a_i b_j \sum_{p=1}^{n} o_{i,p} o_{j,p}$$

$$LtZ_{n \to \infty} = \sum_{i=1}^{m} a_i b_i + \sum_{i \neq j} a_i b_j \left[ Lt_{n \to \infty} \frac{1}{n}\sum_{p=1}^{n} o_{i,p} o_{j,p} \right] = \sum_{i=1}^{m} a_i b_i$$

Note that the second product term is zero since every term inside the second summation may take a value of either 1 or −1 with equal probability. Therefore, the expected value of $$\frac{1}{n}\sum_{p=1}^{n} o_{i,p} o_{j,p}$$

is zero and the corresponding variance is $$\frac{1}{n}.$$

Using the above mentioned technique the global covariance matrix at site C is computed. Although, the algorithm was described just for two data sources, it is easily extended for multiple sites by just repeating it in a pair-wise manner between the participating sites.

Note that the algorithm may also be used for computing the Euclidean distance from distributed heterogeneous data. The squared Euclidean distance between $X_a$ and $X_b$ is defined as $$Dist^2(X_a, X_b) = \sum_{i=1}^{m} (a_i - b_i)^2$$

and it may be written in the following form:

$$Dist^2(X_a, X_b) = \langle X_a, X_a \rangle + \langle X_b, X_b \rangle - 2\langle X_a, X_b \rangle.$$

Since the covariance matrix is directly related to the correlation matrix, the algorithm may also be used for computing the latter.

Results are presented for a distributed inner product computation module using the Forest Cover dataset from the UCI KDD Archive. This example considers 16,384 rows of the data with two features (aspect, slope). FIG. 30 shows the minimum, maximum, average, the standard deviation of the relative error and the corresponding value of n computed over 20 complete runs. As the number of random vectors, n, increases, the estimates become more accurate. FIG. 30 presents some of the statistics regarding the inner product estimation technique using the Forest Cover data. FIG. 30 shows relative errors in computing the inner product between the two features. All results are presented in %. n is the number of randomized trials. It is also represented as the percentage of the size of the actual dataset.

Figure 31:
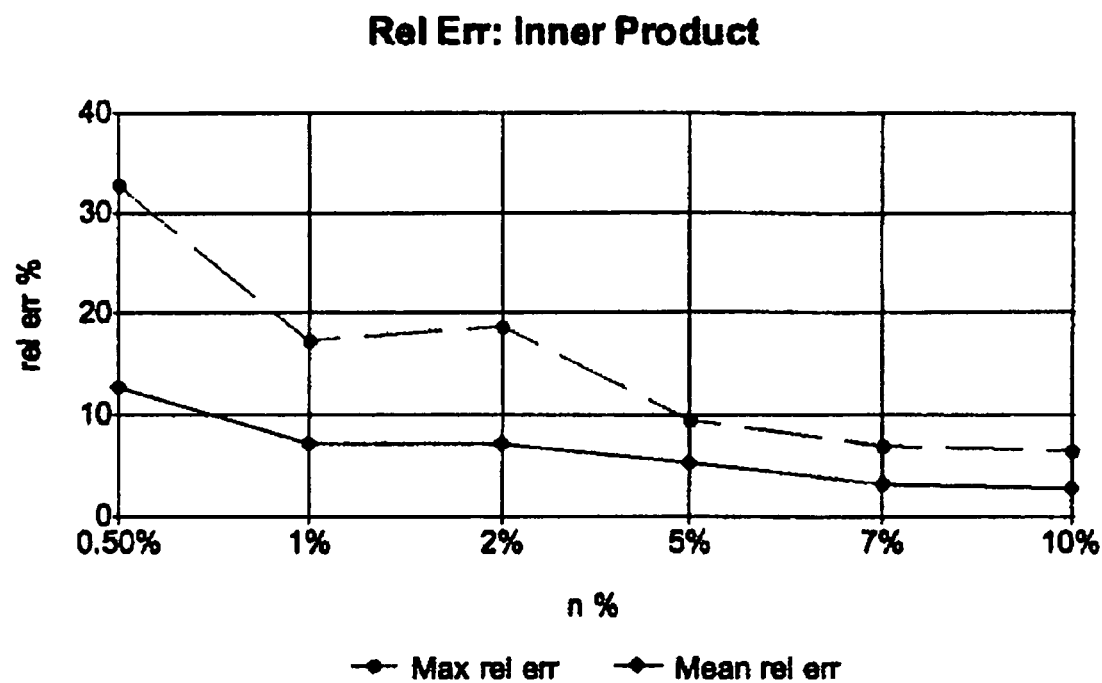
FIG. 31 graphically shows the variation of the maximum and means relative error with respect to n.

FIG. 31 graphically shows the variation of the maximum and means relative error with respect to n. FIG. 31 shows relative error (%) in estimating the inner product from Forest Cover data set as the number of randomized trials, n, is increased.

Figure 32:
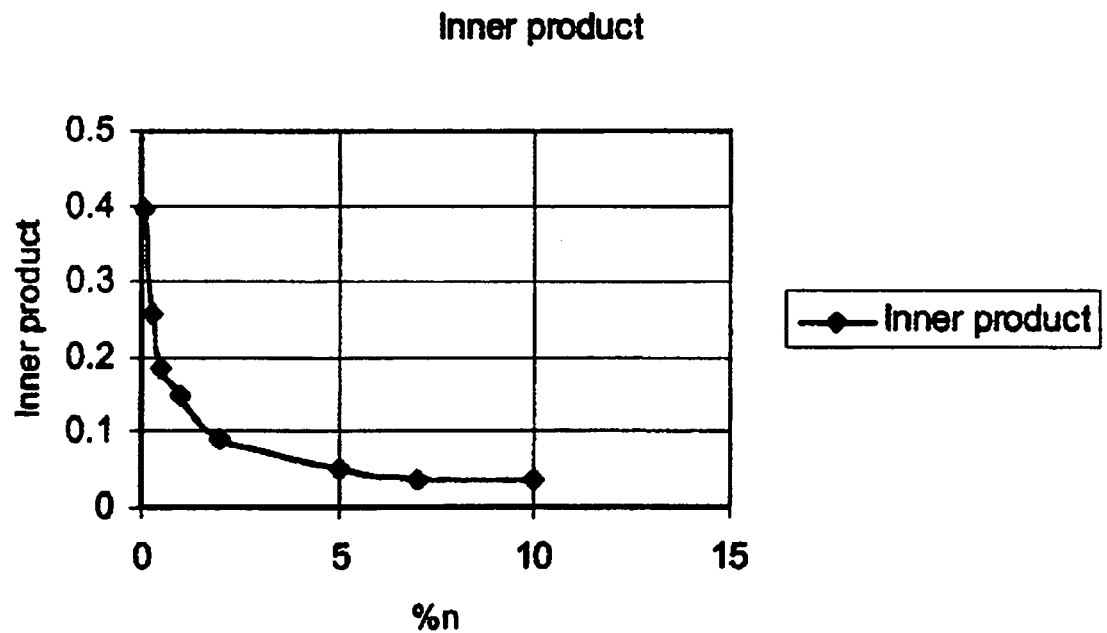
FIG. 32 shows the mean relative error using randomly generated vectors of length 10,000.

FIG. 32 shows the mean relative error using randomly generated vectors of length 10,000. FIG. 32 shows variation of the mean relative error with respect to n (in percentage) using uniformly distributed data [0,1]. The mean is computed over ten independent runs.

Figures 33, 34:
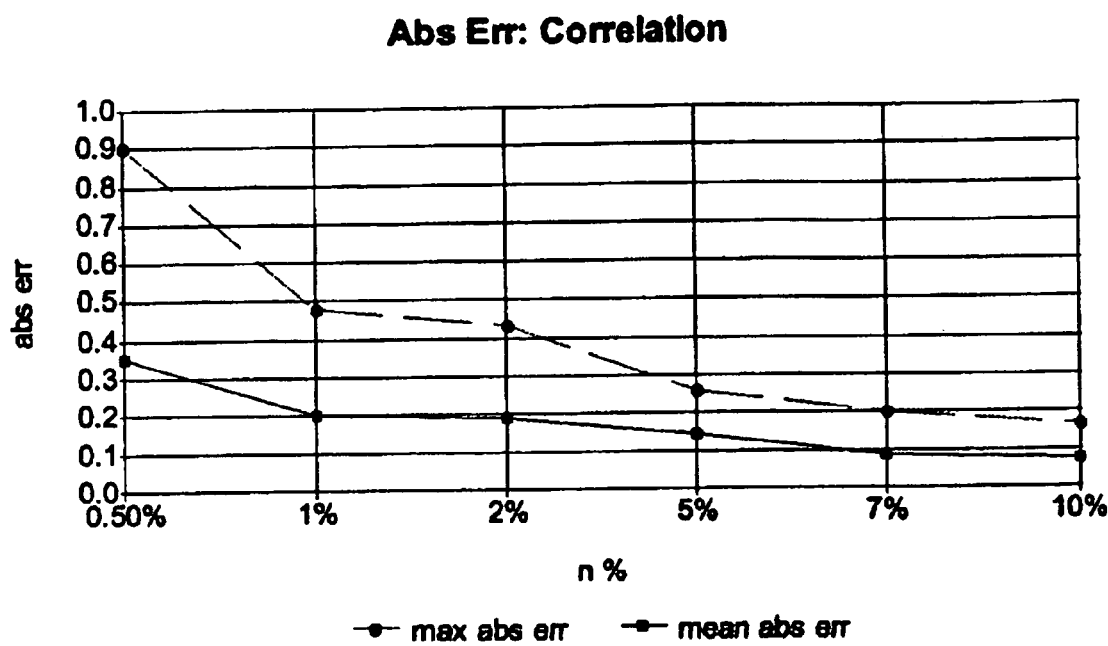
FIG. 33 presents the absolute error values for the corresponding number of randomized trials for the correlation coefficient between the same two features of the Forest Cover dataset.
FIG. 34 shows the minimum, maximum, average, the standard deviation of the absolute error in computing the correlation coefficients.

FIG. 33 presents the absolute error values for the corresponding number of randomized trials for the correlation coefficient between the same two features of the Forest Cover dataset. FIG. 33 shows the variation of the maximum and mean absolute error in computing the correlation coefficient with respect to n. FIG. 33 shows absolute error in estimating the correlation coefficient from Forest Cover data set as the number of randomized trials, n, is increased.

As in FIG. 30, FIG. 34 shows the minimum, maximum, average, the standard deviation of the absolute error in computing the correlation coefficients. FIG. 34 shows absolute errors in computing the correlation between the two features.

16,384 rows of the data are considered and the first 8 features of the dataset for the purpose of experimentation. It is assumed that each feature is available at a different site, and the principle eigenvalues and eigenvectors are computed using the following approach. The covariance matrix is computed by applying the distributed covariance computation algorithm over all pairs of features. Then the eigenvalues and eigenvectors of this covariance matrix are found and reported as estimates of the distributed PCA.

Figure 35:
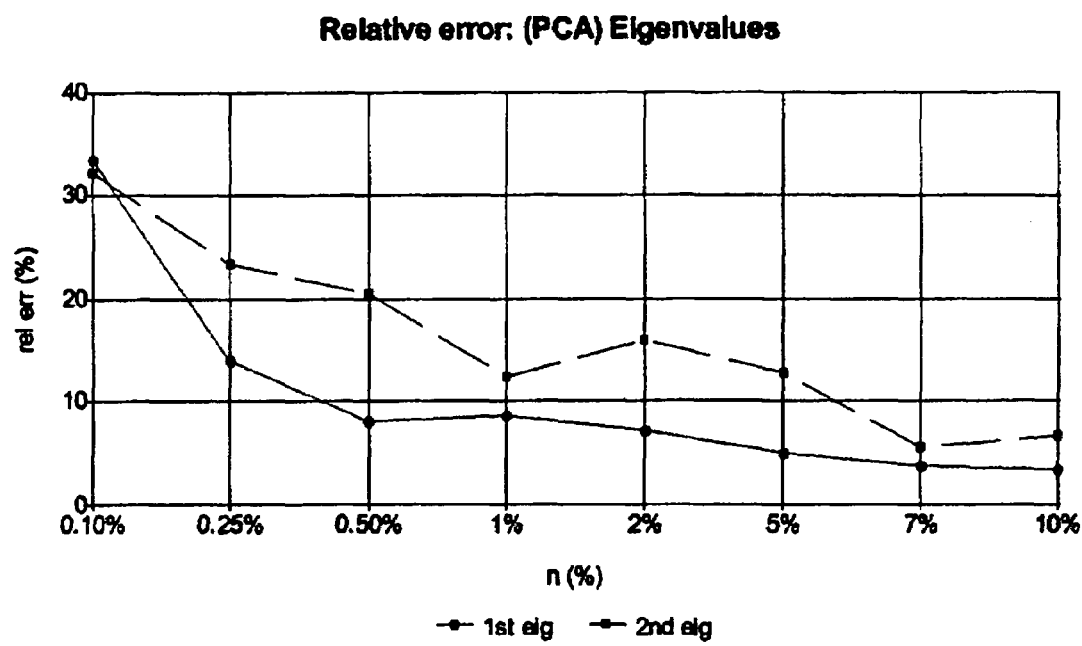
FIG. 35 shows average relative error (%) in estimating the top-2 eigenvalues.
Figure 36:
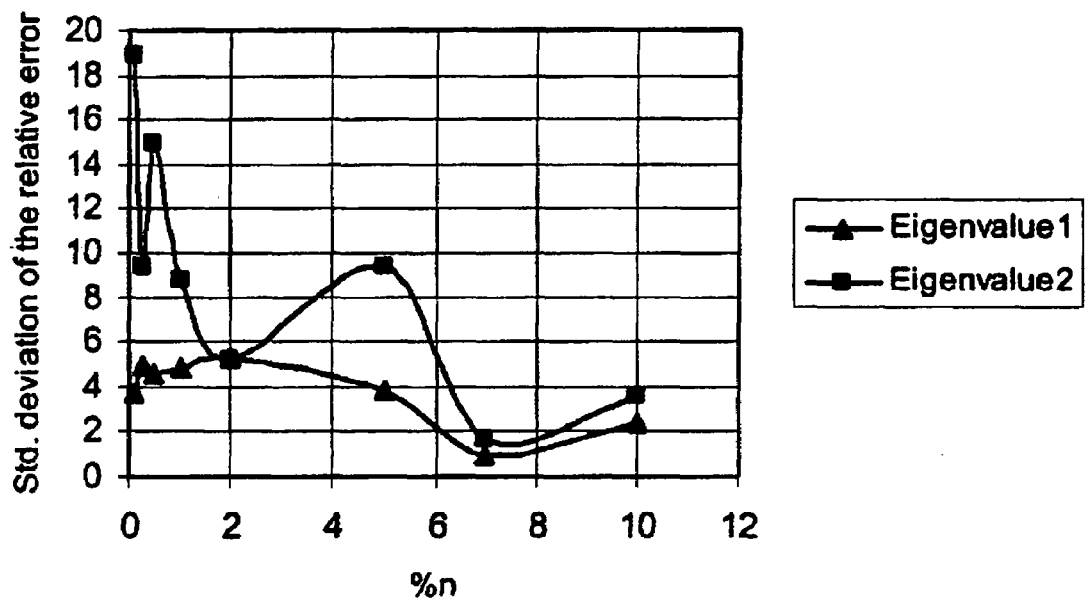
FIG. 36 shows standard deviation in relative errors in computing the principle eigenvalues of the data as n is increased.
Figure 37:
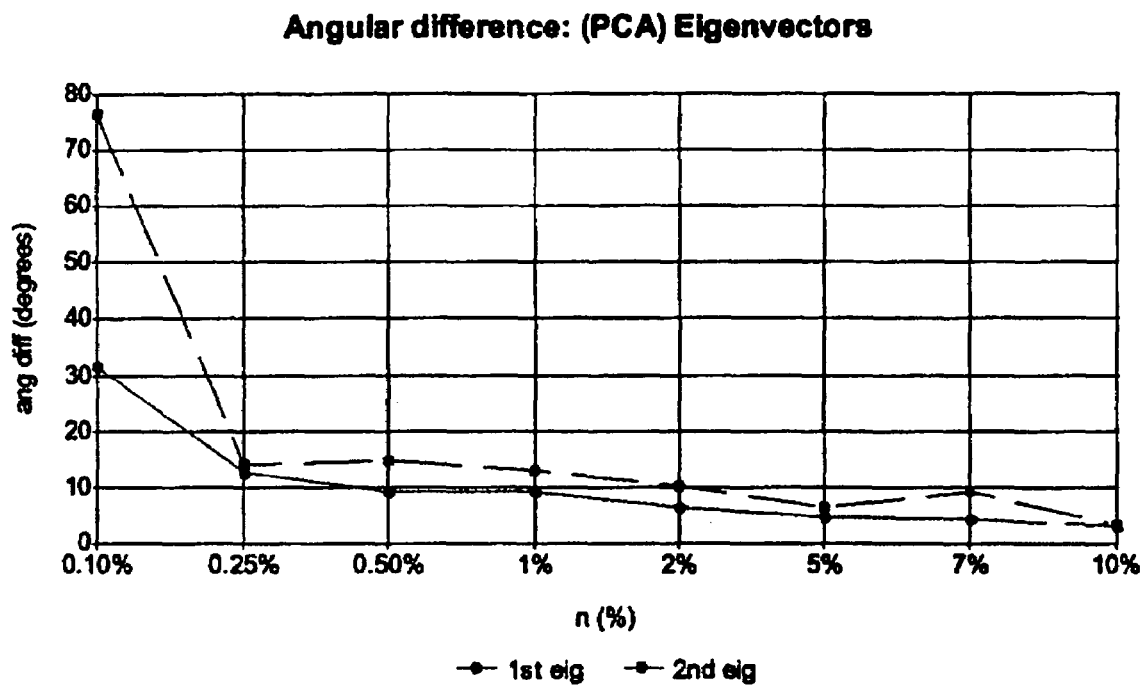
FIG. 37 shows the mean difference in angle (in degrees) between the actual and the estimated top-2 eigenvectors.
Figure 38:
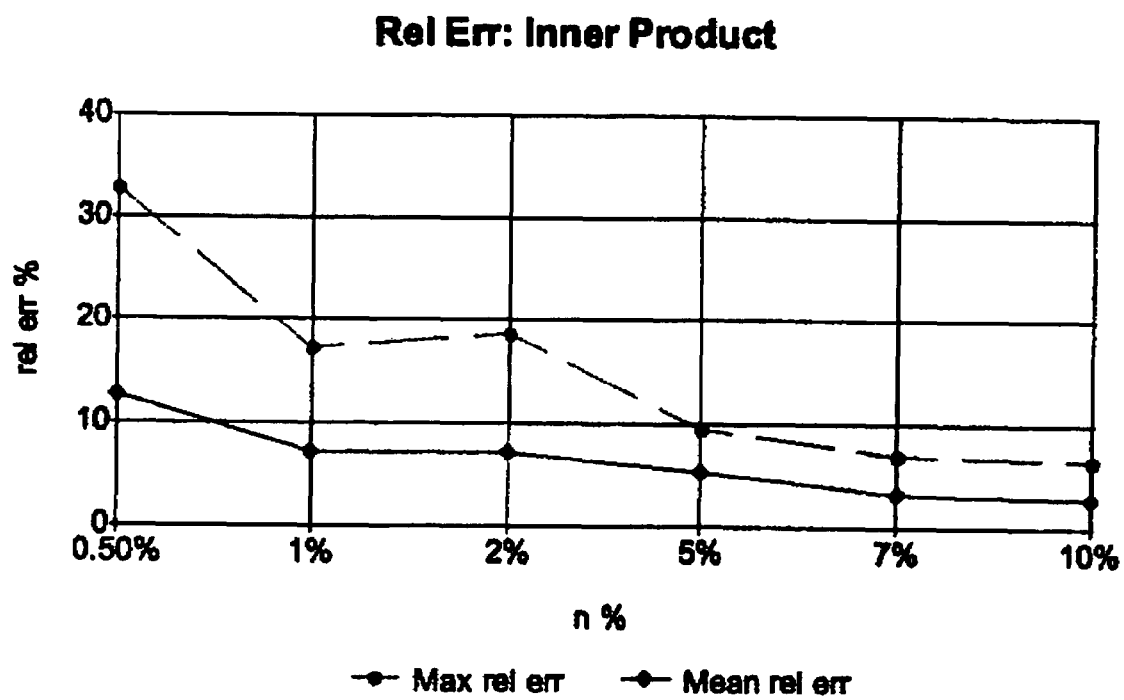
FIG. 38 shows standard deviation in angular difference between the actual principle components and the estimated ones as n increases.

The relative error in the eigenvalues is observed while increasing the number of random vectors, n, for estimating the covariance. Results are summarized in FIGS. 35 and 36. FIG. 35 shows average relative error (%) in estimating the top-2 eigenvalues. The mean is computed over 5 independent runs. FIG. 36 shows standard deviation in relative errors in computing the principle eigenvalues of the data as n is increased. The results are computed over 5 independent runs. Next the angle between the estimated principle components and the actual ones is observed. The results are summarized in FIGS. 37 and 38. The results are averaged over 5 runs. FIG. 37 shows the mean difference in angle (in degrees) between the actual and the estimated top-2 eigenvectors. The value of n (in percentage) reflects the communication cost for the corresponding accuracy. The mean is computed over 5 runs. FIG. 38 shows standard deviation in angular difference between the actual principle components and the estimated ones as n increases. The standard deviation is computed over 5 independent runs.

The algorithm of the present invention relies on a distributed algorithm for computing inner product between two data vectors that may have in its own utility in many applications.

The distributed PCA technique exploits the fact that large random vectors are almost orthogonal. The preliminary results appear promising and significantly better than the CPCA, a previously reported technique for performing distributed PCA from heterogeneous data. Unlike the CPCA technique, the current approach does not require performing local PCA at every site. This saves local computation overhead that may be very important in many distributed data mining applications for resource-constrained environments, such as sensor networks.

Moreover, unlike the CPCA the communication overhead of the proposed technique does not really depend on the quality of the sampling-based estimation of the data. Instead, for a given level of accuracy, the communication overhead of the current algorithm depends on the effect of law of large numbers on making random vectors orthogonal. This also makes the technique more applicable to problems that involve detecting outliers.

The following is an example of modeling fuel consumption using velocity and acceleration histograms of a driving pattern.

First, a basic algorithm is defined for obtaining the necessary histograms and fuel consumption values from raw data taken from a vehicle. Next, specifications are given for adding functionality to a control center. Finally, experimental results are achieved Basic Algorithm:

1. Collect the data such that a large number of data points are collected over a variety of driving conditions. Sufficient data must be gathered for recognizing declining trends in fuel level percentage. Data collected over, for example but not limited to, one week or more of normal driving is generally adequate.

2. Divide the data into n partitions so that each partition contains a fairly large number of data points (approximately, but not limited to, 1000 data points per partition). The value of n should be at least equal to approximately 11 or 12, but preferably larger.

3. In each partition, smooth the fuel level percentage observations values:

a. Scan the fuel level values to ensure there are not any unusually large jumps. Any such jump probably means the vehicle was refueled. This situation must be handled before proceeding to step (b) as described below in step (d).

b. Take a moving average of size 100.

c. Let max{SmoothedFuel(i)} and min{SmoothedFuel(i)} be the maximum and minimum of the smoothed fuel level percentage values in the $i^{th}$ partition.

d. If the vehicle was refueled within a partition, the fuel level percentage values must be adjusted before proceeding to step (b) by one of the following methods:

Easy Way:

Divide this partition into 2 separate partitions at the point where refueling occurred.

Better Way:

i. Average the 100 values before the jump and average the 100 values after the jump. Let δ be the magnitude of the difference between these two average values.

ii. When computing the 100 point moving average of fuel level, do not let points before the jump be averaged with points after the jump and vice versa.

iii. Once all of the moving average values are obtained, subtract δ from all moving average values that were recorded after the jump in fuel level.

Figure 39:
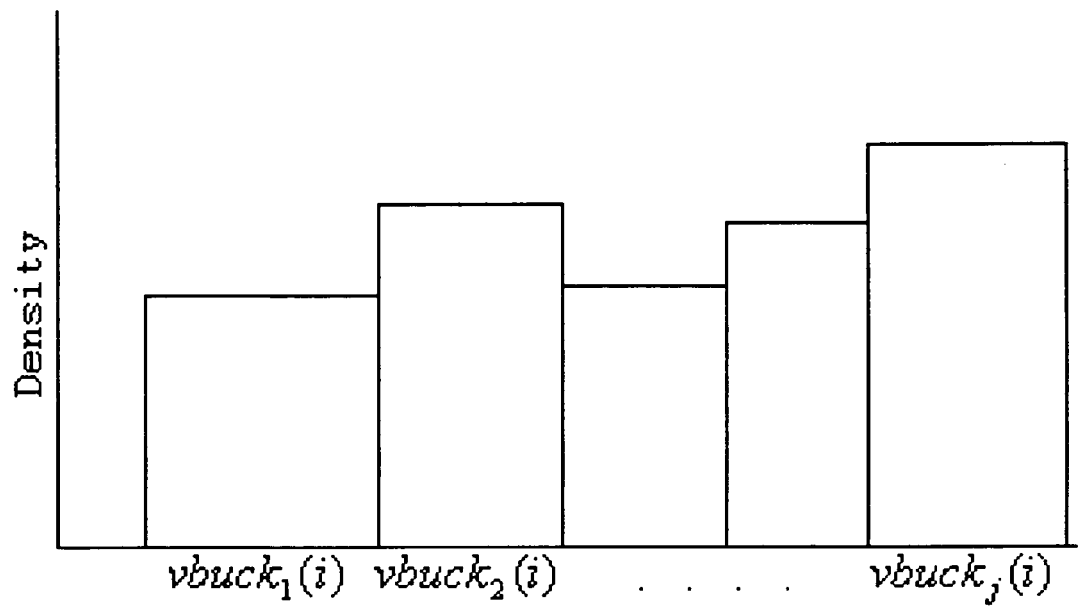
FIG. 39 is a velocity histogram for the $i^{th}$ data partition.
Figure 40:
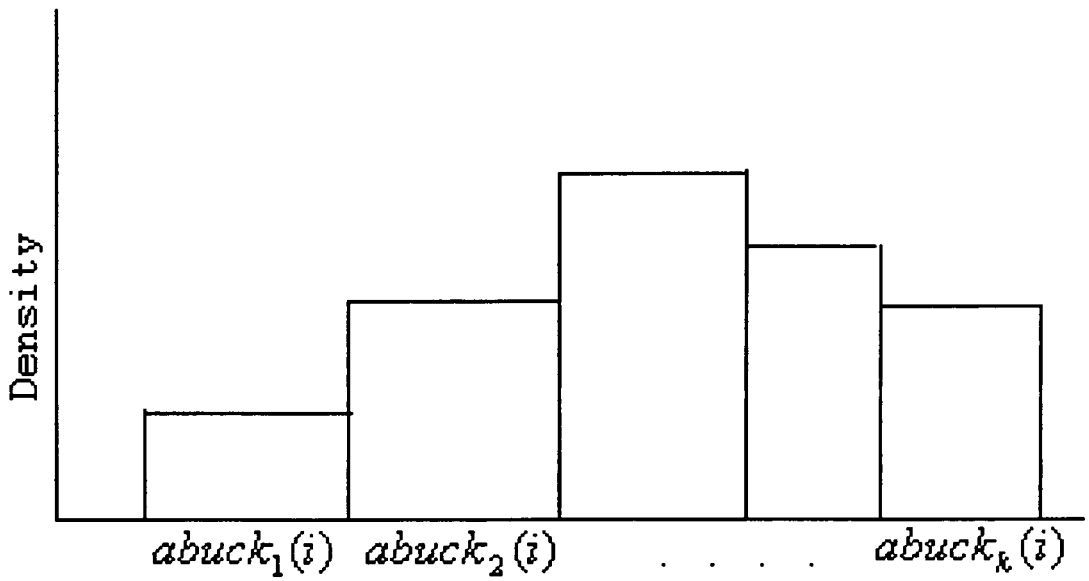
FIG. 40 is an acceleration histogram for the $i^{th}$ data partition.

4. For each partition, compute a histogram of the velocity values and the acceleration values. The height of the bars in these histograms should represent density. There are n velocity histograms and n acceleration histograms. Each velocity histogram should have j identical bucket ranges and each acceleration histogram should have k identical bucket ranges. The buckets should include all observed values. Example histograms are shown in FIGS. 39 and 40. FIG. 39 is a velocity histogram for the $i^{th}$ data partition. FIG. 40 is an acceleration histogram for the $i^{th}$ data partition.

The ranges of each of these buckets should be small enough to be meaningful. For velocity the range of each bucket should span about $$10 \frac{\text{miles}}{\text{hour}}$$

and for acceleration the range of each bucket should span about $$0.001 \frac{\text{miles}}{\text{sec}^2}.$$

5. In each partition, compute the approximate miles per gallon. This is done as follows for the $i^{th}$ partition:

a. Let odometer(i) be the difference in odometer readings between the first and last data point in the $i^{th}$ partition.

b. Then the average miles per gallon in the $i^{th}$ partition is approximated by:

$$MPG(i) = \frac{\text{odometer}(i)}{\left[\frac{\max\{SmoothedFuel(i)\} - \min\{SmoothedFuel(i)\}}{100} * TankCapacity\right]}$$

TankCapacity in gallons and odometer(i) in miles are measured.

6. At this point a model is desired such that:

$MPG(i)=f(vbuck_1(i), vbuck_2(i), \ldots, vbuck_j(i), abuck_1(i), abuck_2(i), \ldots, abuck_k(i))$ Where, for example, $vbuck_1(i)$ equals the density of this bucket in the velocity histogram for the $i^{th}$ partition of data. Linear regression builds such a model.

Figure 41:
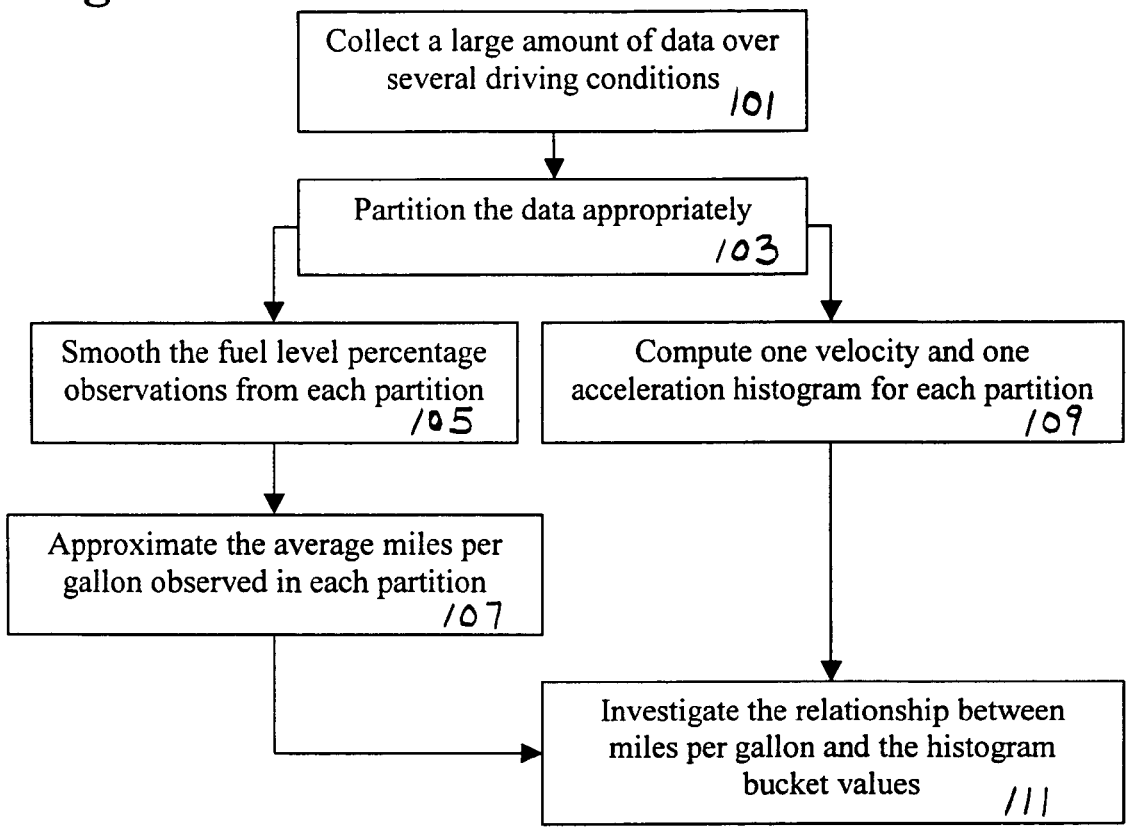
FIG. 41 is a data flow of fuel consumption modeling algorithm.

FIG. 41 presents a data flow diagram for the above algorithm. First a large amount of data is collected over several driving conditions 101. The data is then partitioned appropriately 103. The partitioned data is then smoothed in relation to the fuel level percentage observations from each partition 105, and an approximate miles per gallon observed in each partition is calculated 107. Alternatively, one velocity and one acceleration histogram are calculated for each histogram 109. The results from the data processing are then used to investigate relationships between miles per gallon and the histogram bucket values 111.

Specifications:

1. User starts this process from the control station.

2. This process is most effective for a large number of data points over a variety of different driving conditions (highway, side-street, heavy traffic, etc). The user specifies the segment over which to collect the data, although the system provides some guidance.

3. The system needs to know the maximum capacity (in gallons) of the vehicle's fuel tank.

4. A method is provided for a user to visualize the correlation coefficients between miles per gallon and the densities of the histogram buckets (which represent the amount of time spent in various speed and acceleration regimes).

5. The number of buckets and the bucket ranges cannot vary from one velocity histogram to the next. Same holds for acceleration histograms. If desired the user is able to view the histograms for each partition.

6. The user is able to use the histogram bucket data to build models for MPG. These models are built using linear regression; the control station provides some recommended models and analyzes the adequacy of any such model.

Results from an experiment are listed below.

FIG. 42 shows a data set that contains data collected from a 2003 Chevy Cavalier over a period of roughly one week. FIG. 42 shows densities (rounded to 3 decimals) of all the histogram buckets for each of the 11 partitions of a 2003 Chevy Cavalier data. This data contains approximately 13,000 observations. The above analysis was performed on this data set. The following results were achieved with n=11 (approximately 1000 data points per partition).

FIG. 43 is a correlation coefficient between miles per gallon and the buckets heights in the velocity and acceleration histogram. FIG. 43 shows a relationship between miles per gallon and the amount of time spent in the different speed and acceleration regimes as defined by the buckets. The relationship appears logical because miles per gallon are higher when traveling at higher speeds than at lower speeds. The relationship also shows that miles per gallon decrease as more time is spent accelerating or decelerating.

Figure 44:
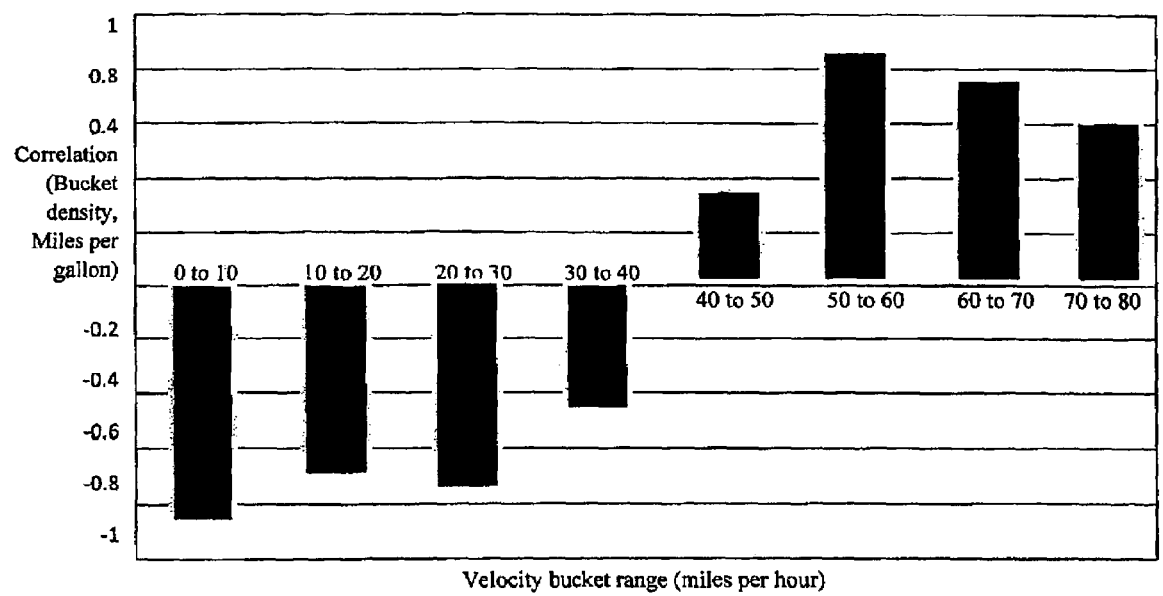
FIG. 44 is a correlation coefficient between velocity bucket densities and miles per gallon.
Figure 45:
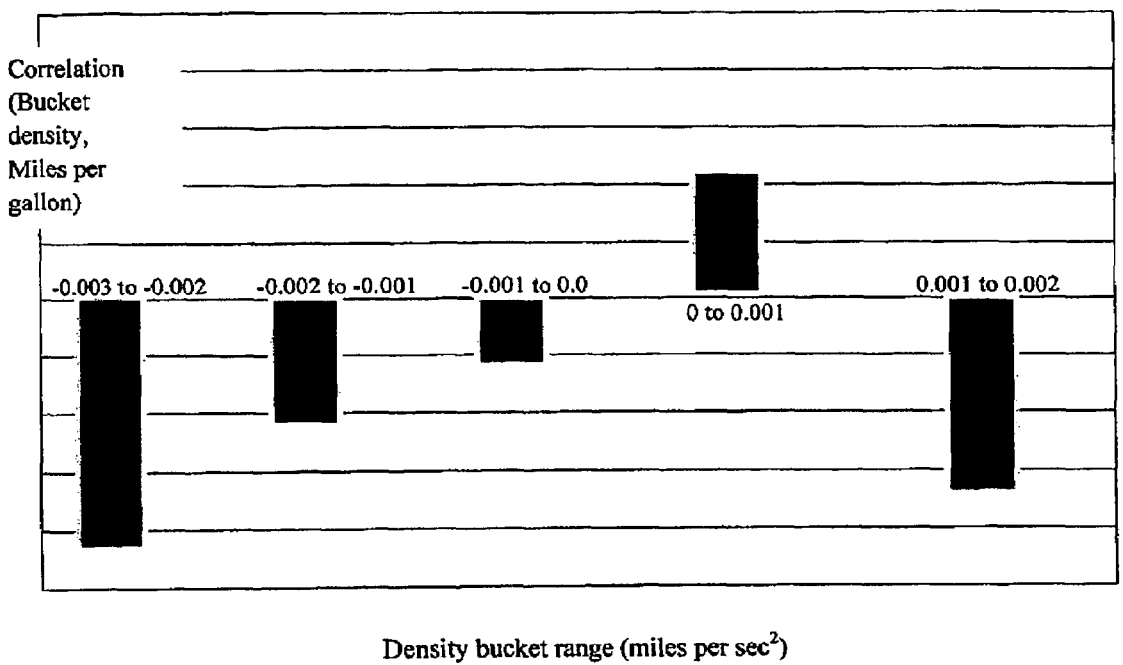
FIG. 45 is a correlation coefficient between acceleration bucket density and miles per gallon.

FIG. 44 is a correlation coefficient between velocity bucket densities and miles per gallon. FIG. 45 is a correlation coefficient between acceleration bucket density and miles per gallon.

The next step is to model the relationship by fitting a model to the data in FIG. 42. FIG. 46 shows one possible linear model using R.

The following is an example of landmark characterization. Suppose a vehicle traverses a segment between points A and B. Along that path the vehicle passes through several landmarks such as stop signs, side streets, highways, etc. At each of these landmarks the vehicle's velocity and acceleration is expected to behave in specific ways. For example, at a stop sign the vehicle decelerates until the velocity is zero and then the vehicle accelerates back to its prior speed. A transition phase is defined as a point where the vehicle enters into a new landmark. Transition phases are identified, and then the corresponding landmark types are determined.

Land Mark Types

1. Points where the vehicle always stops.

Examples: stop sign, toll booth, check point.

Characteristics: no velocity, in the past the vehicle almost always stops at this point.

2. Points where the vehicle stops with some regularity.

Examples: traffic light, merge area, crosswalk, left turn.

Characteristics: no velocity, judging by past behavior there is a large probability that the vehicle stops at this point.

3. Periods of constant velocity.

Examples: highway traveling, large two-lane road.

Characteristics: only small changes in acceleration, small variance in velocity values, past behavior indicates that the velocity is constant over this region.

4. Periods of rapidly fluctuating velocity.

Examples: heavy traffic, small side street.

Characteristics: fluctuating positive and negative acceleration, large variance in velocity values, past behavior indicates similar behavior is expected over this region.

5. Periods of constant acceleration and changing velocity.

Examples: exiting/entering the highway.

Characteristics: large changes in velocity values, but negligible changes in the slope of the velocity graph.

The algorithm is outlined as follows. The algorithm needs to scan the velocity data over the given segment to classify the landmarks. This part of the algorithm has two major modules. The first major module looks at the velocity and determines when a transition phase occurs. Recall that a transition phase is defined as a point where a vehicle enters a new landmark. Transition phases are located by creating a linear segmentation of the velocity data and then analyzing the slope and endpoints of these lines. The next major module is a decision structure that looks at the velocity data surrounding the landmark and classifies the landmark as one of the above types.

Figure 47:
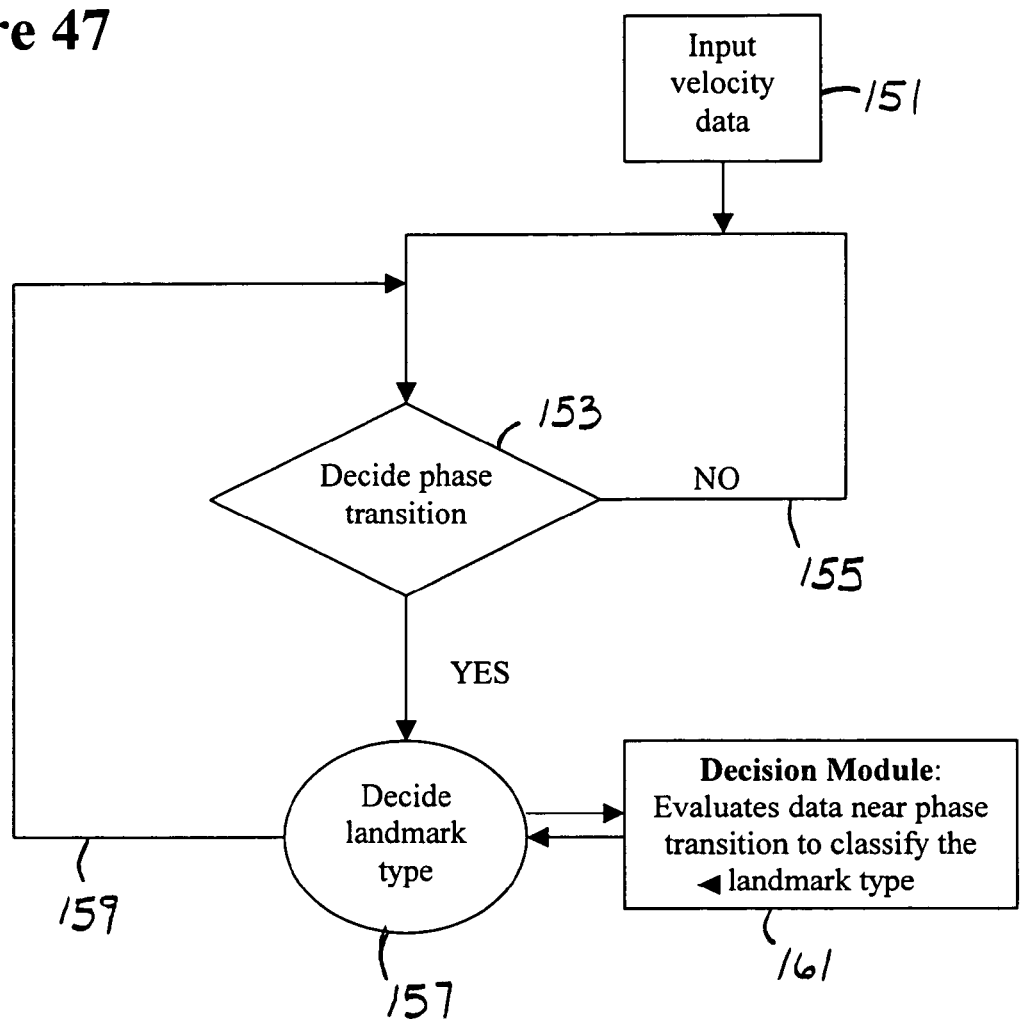
FIG. 47 is a data flow of landmark identification algorithm.

This algorithm is outlined in FIG. 47. Input velocity data 151 enters the system and decides a phase transition 153. If not, the data is sent back around 155 and is mixed with new input velocity data 151. If yes, a landmark type is decided 157. Results are sent back 159 to the loop 155 or are sent to a decision module 161. The decision module 161 evaluates data near phase transition to classify the landmark type. Results are then sent back to the landmark type decision 157.

If a segment is traversed several times from point A to B, the velocity data is not expected to be the same every time. Random events such as the color of a traffic light, road congestion, surrounding drivers, etc. affects the vehicle's behavior. In order to accurately define the landmarks on a segment a segment must be traversed several times, and the landmarks found during each traversal are compared. The comparison allows differentiation between a stop sign and a traffic light or between a slow moving side street and a heavily congested highway.

While the invention has been described with reference to specific embodiments, modifications and variations of the invention may be constructed without departing from the scope of the invention.

The invention claimed is:

1. A vehicle fleet monitoring system comprising:
a sensor data bus connected to vehicle components,
vehicle and driver data collected from the sensor data bus,
an onboard data stream mining and management module,
computing patterns the vehicle defined by the following data types used for representing statistical models generated onboard:
a data structure defining mathematical functions of the form F: $X^n \rightarrow Y$, where F denotes the function, $X^n$ denotes the domain of the function, n denotes the number of dimensions of the domain, and Y is the range of the function, and the domain of the function is defined by the vehicle, driver, emissions and fleet data,
a data structure defining a collection of mathematical matrices A[t] for t=1, 2, . . . m,
where each cell of the t-th matrix A[i][j][t] is a function $F_{i,j}$ of the vehicle, driver, emissions and fleet data, and
a data structure defining graphical relationship among different parameters in the vehicle, driver, emissions, and fleet data,
computing "patterns" onboard the vehicle defined by the following data types used for representing statistical models generated onboard:
a data structure defining mathematical functions of the form F: $X^n \rightarrow Y$, where F denotes the function, $X^n$ denotes the domain of the function, n denotes the number of dimensions of the domain, and Y is the range of the function, and the domain of the function is defined by the vehicle, driver, emissions and fleet data,
a data structure defining a collection of mathematical matrices A[t] for t=1, 2, . . . , m, where each cell of the t-th matrix A[i][j][t] is a function $F_{i,j}$ of the vehicle, driver, emissions and fleet data, and
a data structure defining graphical relationship among different parameters in the vehicle, driver, emissions, and fleet data,
an onboard data stream mining within the onboard data stream mining and management module for receiving the data collected from the sensor data bus,
an onboard micro database,
wherein data collected from the sensor data bus is sent to the onboard data stream mining,
wherein data patterns are selected and sent to the onboard micro database,
and wherein remaining data are thrown away,
a remote control center,
an onboard communication module for managing communication between the remote control center and the onboard micro database and
wherein periodically, or upon queries from the remote control center, the data patterns stored in the onboard micro database are communicated to the remote control center, and
queries and responses are communicated between the remote control center and the onboard micro database.

2. The apparatus of claim 1, further comprising a privacy management module connected to the onboard communication module.

3. The apparatus of claim 1, further comprising a power management module connected to the onboard communication module.

4. The apparatus of claim 1, further comprising an onboard graphic user interface for local user interaction.

5. The apparatus of claim 4, wherein a local user communicates queries and responses directly to the onboard micro database.

6. The apparatus of claim 1, wherein the onboard data stream management system runs on a PDA, cell phone or embedded device.

7. The apparatus of claim 1, wherein actions are triggered by predetermined interesting data and patterns.

8. The apparatus of claim 1, wherein the remote control center allows remote management and mining of vehicle data streams from multiple vehicles, interactive statistical data analysis and visualization of driving characteristics.

9. The apparatus of claim 1, wherein distributed data mining algorithms are used for mining the collected data.

10. A vehicle fleet monitoring method comprising:
collecting vehicle, driver and fleet data with a sensor data bus,
transferring the collected data from the sensor data bus to an onboard data stream management system within an onboard data stream mining and management module,
onboard data stream mining the collected data,
computing patterns the vehicle defined by the following data types used for representing statistical models generated onboard:
a data structure defining mathematical functions of the form F: $X^n \rightarrow Y$, where F denotes the function, $X^n$ denotes the domain of the function, n denotes the number of dimensions of the domain, and Y is the range of the function, and the domain of the function is defined by the vehicle, driver, emissions and fleet data,
a data structure defining a collection of mathematical matrices A[t] for t=1, 2, . . . m, where each cell of the t-th matrix A[i][j][t] is a function $F_{i,j}$ of the vehicle, driver, emissions and fleet data, and a data structure defining graphical relationship among different parameters in the vehicle, driver, emissions, and fleet data, computing "patterns" onboard the vehicle defined by the following data types used for representing statistical models generated onboard:

a data structure defining mathematical functions of the form F: $X^n \rightarrow Y$, where F denotes the function, $X^n$ denotes the domain of the function, n denotes the number of dimensions of the domain, and Y is the range of the function, and the domain of the function is defined by the vehicle, driver, emissions and fleet data, a data structure defining a collection of mathematical matrices A[t] for t=1, 2, ..., m, where each cell of the t-th matrix A[i][j][t] is a function $F_{i,j}$ of the vehicle, driver, emissions and fleet data, and a data structure defining graphical relationship among different parameters in the vehicle, driver, emissions, and fleet data, extracting data patterns from the transferred data with the onboard data stream mining, throwing away the data after the extracting the data patterns, sending the data patterns from the onboard data stream mining to an onboard micro database, storing the data patterns in the onboard micro databases, and periodically or upon queries from a remote control center sending the stored data patterns from the onboard micro database through an onboard communication module to the remote control center.

11. The method of claim 10, wherein the data stream management system selects data patterns from the data collected from the sensor data bus for directly sending the selected data patterns to the onboard micro database and the remaining collected data is sent to the data stream mining.

12. The method of claim 11, wherein data stream mining separates from the remaining collected data into second interesting data and patterns for sending to the onboard micro database and for throwing away data.

13. The method of claim 10, further comprising managing privacy in the onboard communication module with an onboard privacy management module.

14. The method of claim 10, further comprising managing power with an onboard power management module.

15. The method of claim 10, further comprising providing an onboard graphic user interface for local user interaction and communicating queries and responses directly from a local user to the onboard micro database.

16. The method of claim 10, wherein the onboard data stream management system runs on a PDA, cell phone or embedded device.

17. The method of claim 10, further comprising actions triggered by predetermined interesting data and patterns.

18. The method of claim 10, wherein the mining the data collected from the sensor data bus uses distributed data mining algorithms.

19. A method of using data from operations of a vehicle comprising:

connecting vehicle components to a sensor bus, supplying vehicle data to the sensor bus, providing sensor data streams from the sensor bus to an onboard data stream management system, separating generated data patterns from the data streams by the data stream management system, computing patterns the vehicle defined by the following data types used for representing statistical models generated onboard:

a data structure defining mathematical functions of the form F: $X^n \rightarrow Y$, where F denotes the function, $X^n$ denotes the domain of the function, n denotes the number of dimensions of the domain, and Y is the range of the function, and the domain of the function is defined by the vehicle, driver, emissions and fleet data, a data structure defining a collection of mathematical matrices A[t] for t=1, 2, ... m, where each cell of the t-th matrix A[i][j][t] is a function Fi,j of the vehicle, driver, emissions and fleet data, and a data structure defining graphical relationship among different parameters in the vehicle, driver, emissions, and fleet data, computing "patterns" onboard the vehicle defined by the following data types used for representing statistical models generated onboard:

a data structure defining mathematical functions of the form F: $X^n \rightarrow Y$, where F denotes the function, $X^n$ denotes the domain of the function, n denotes the number of dimensions of the domain, and Y is the range of the function, and the domain of the function is defined by the vehicle, driver, emissions and fleet data, a data structure defining a collection of mathematical matrices A[t] for t=1, 2, ..., m, where each cell of the t-th matrix A[i][j][t] is a function Fi,j of the vehicle, driver, emissions and fleet data, and a data structure defining graphical relationship among different parameters in the vehicle, driver, emissions, and fleet data, providing the separated data patterns to an onboard micro database, storing the separated data patterns in the onboard micro database, throwing away the data, receiving requests from a remote control center, directing the request to the onboard micro database, responding to the requests by providing the stored data patterns from the onboard micro database to the remote control center, and periodically providing the stored data patterns from the onboard database to the remote control center.

20. The method of claim 19, further comprising querying the onboard micro database from an onboard control center and responding to the request from the onboard control center by providing the data patterns from the onboard micro database.

21. The method of claim 10, further comprising of the following algorithms:

fast detection of changes and computation of correlation, covariance, inner product, and distance matrices onboard the vehicle and sending the results to the remote server over wired or wireless network, a collection of vehicle health tests for monitoring the health of the vehicle and driver behavior and sending the results to the remote server over wired or wireless network, distributed Euclidean distance, covariance, and inner product matrices computation algorithms in a fleet environment involving the vehicles and the remote servers and sending the results to the remote server over wired or wireless network, distributed principal component analysis (PCA) in a fleet environment involving the vehicles and the remote servers and sending the results to the remote server over wired or wireless network, onboard principal component analysis (PCA) of the vehicle and driver data and sending the results to the remote server over wired or wireless network, onboard randomized projection of the vehicle and driver data and sending the results to the remote server over wired or wireless network, clustering, predictive function learning, link analysis and outlier detection onboard the vehicle and sending the results to the remote server over a wired or wireless network, algorithms for modeling fuel consumption behavior as a function of different vehicle and driving parameters and sending the results to the remote server over wired or wireless network, and time series analysis and data stream mining algorithms for identifying the special types of driving behavior segments based on the vehicle and driver data and sending the results to the remote server over wired or wireless network.

\* \* \* \* \*